(12) United States Patent
Boudreau et al.

(10) Patent No.: US 11,050,754 B2
(45) Date of Patent: Jun. 29, 2021

(54) SECURE REMOTE CONTROL OF INTEGRATED CONTROLS FOR ELECTRICAL DEVICES

(71) Applicant: SIGNIFY HOLDING B.V., Eindhoven (NL)

(72) Inventors: Paul Boudreau, Lawrenceville, GA (US); Russell Leake, Atlanta, GA (US); James Richard Christ, Peachtree City, GA (US)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/599,324

(22) Filed: Oct. 11, 2019

(65) Prior Publication Data
US 2020/0120103 A1   Apr. 16, 2020

Related U.S. Application Data

(60) Provisional application No. 62/744,369, filed on Oct. 11, 2018.

(51) Int. Cl.
*H04L 29/06* (2006.01)
*H04W 12/08* (2021.01)

(52) U.S. Cl.
CPC .......... *H04L 63/102* (2013.01); *H04W 12/08* (2013.01)

(58) Field of Classification Search
CPC . H04L 63/102; H04L 63/083; H04L 63/0861; H04L 12/2829; H04L 2012/2841; H04L 12/282; H04L 9/3231; H04W 12/08; H04W 12/0802; H04W 12/0804; H04W 12/0806; H04W 12/0808; H04W 12/68; G07C 9/22; G07C 9/253; G07C 9/32; G07C 2209/14; G05B 2219/24032; G06F 1/24; G06F 11/1438; G06F 11/1441; G06F 21/575
USPC ....................................................... 340/5.53
See application file for complete search history.

(56) References Cited

U.S. PATENT DOCUMENTS

| | | | | |
|---|---|---|---|---|
| 4,143,368 A | * | 3/1979 | Route | B60R 25/1001 340/426.17 |
| 4,573,046 A | * | 2/1986 | Pinnow | G07C 9/00817 340/5.64 |
| 4,754,255 A | * | 6/1988 | Sanders | G07C 9/00182 307/10.4 |
| 4,856,072 A | * | 8/1989 | Schneider | B60R 16/0373 381/86 |

(Continued)

*Primary Examiner* — Edwin C Holloway, III

(57) ABSTRACT

An electrical device can include at least one electrical device component and at least one sensor that measures at least one parameter. The electrical device can also include an integrated control interface disposed on a housing of the electrical device and coupled to the at least one electrical device component, where the integrated control interface allows for manual control of the at least one electrical device component. The electrical device can further include an access controller communicably coupled to the at least one electrical device component and the at least one sensor. The access controller can receive, from the at least one sensor, a communication sent by a user. The access controller can also control, based on determining that the user has the authority to control the at least one electrical device component, the at least one electrical device component based on instructions.

20 Claims, 14 Drawing Sheets

(56) References Cited

U.S. PATENT DOCUMENTS

| | | | | |
|---|---|---|---|---|
| 5,864,297 | A * | 1/1999 | Sollestre | G07C 9/00817 340/426.36 |
| 6,426,705 | B1 * | 7/2002 | Wischoeffer | H04N 5/44582 340/12.27 |
| 10,127,801 | B2 | 11/2018 | Raji et al. | |
| 2008/0113619 | A1 * | 5/2008 | Torrance | H04W 12/06 455/41.2 |
| 2009/0195404 | A1 * | 8/2009 | Combs, Jr. | H04N 5/4403 340/4.31 |
| 2010/0073497 | A1 * | 3/2010 | Katsumata | H04N 5/23203 348/211.99 |
| 2010/0283579 | A1 * | 11/2010 | Kraus | G07C 9/00944 340/5.7 |
| 2011/0119476 | A1 * | 5/2011 | Dai | H04L 12/12 713/2 |
| 2011/0153121 | A1 * | 6/2011 | Minassian | B60R 25/24 701/2 |
| 2012/0062026 | A1 | 3/2012 | Raji et al. | |
| 2013/0043984 | A1 * | 2/2013 | Goetzke | G08C 23/04 340/12.1 |
| 2015/0262443 | A1 * | 9/2015 | Chong | G08C 17/02 340/5.71 |
| 2015/0341336 | A1 * | 11/2015 | Trell | H04N 5/4403 340/4.31 |

\* cited by examiner

SECURE REMOTE CONTROL OF INTEGRATED CONTROLS FOR ELECTRICAL DEVICES

CROSS REFERENCE TO RELATED APPLICATIONS

This application claims priority under 35 U.S.C. § 119 to U.S. Provisional Patent Application Ser. No. 62/744,369, titled "Secure Remote Control Of Integrated Controls For Electrical Devices" and filed on Oct. 11, 2018, the entire contents of which are hereby incorporated herein by reference.

TECHNICAL FIELD

The present disclosure relates generally to electrical devices, and more particularly to systems, methods, and devices for secure remote control of integrated controls for electrical devices.

BACKGROUND

A number of electrical devices have control features located directly on the electrical device itself. Specifically, control features such as on/off, reset, volume increases, volume decrease, and mute volume can be located directly on the electrical device in the form of pushbuttons, switches, dials, sliders, and/or other similar features. In some cases, if the electrical device is not normally or safely accessible, these control features are not practical to use because they require direct physical interaction. In other cases, these control features can present a security risk if those control features are operated inadvertently and/or are operated by a person without the proper authority to do so.

SUMMARY

In general, in one aspect, the disclosure relates to an electrical device that includes at least one electrical device component. The electrical device can also include at least one sensor that measures at least one parameter. The electrical device can further include an integrated control interface disposed on a housing of the electrical device and coupled to the at least one electrical device component, where the integrated control interface allows for manual control of the at least one electrical device component. The electrical device can also include an access controller communicably coupled to the at least one electrical device component and the at least one sensor. The access controller can receive, from the at least one sensor, a communication sent by a user, where the communication includes an identification of the user and instructions to control the at least one electrical device component. The access controller can also determine, based on the identification of the user, whether the user has authority to control the at least one electrical device component. The access controller can further control, based on determining that the user has the authority to control the at least one electrical device component, the at least one electrical device component based on the instructions. Controlling the at least one electrical device component by the access controller can generate an identical result compared to manually engaging the integrated control interface.

In another aspect, the disclosure can generally relate to a system that includes an electrical device, which can include at least one electrical device component and at least one sensor that measures at least one parameter within a communication range. The electrical device can also include an integrated control interface disposed on a housing of the electrical device and coupled to the at least one electrical device component, where the integrated control interface allows for manual control of the at least one electrical device component. The system can also include an access controller communicably coupled to the at least one electrical device component and the at least one sensor. The access controller can receive, from the at least one sensor, a communication, where the communication includes an identification of a user and instructions to control the at least one electrical device component. The access controller can also determine, based on the identification of the user, whether the user has authority to control the at least one electrical device component. The access controller can further control, based on determining that the user has the authority to control the at least one electrical device component, the at least one electrical device component based on the instructions.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
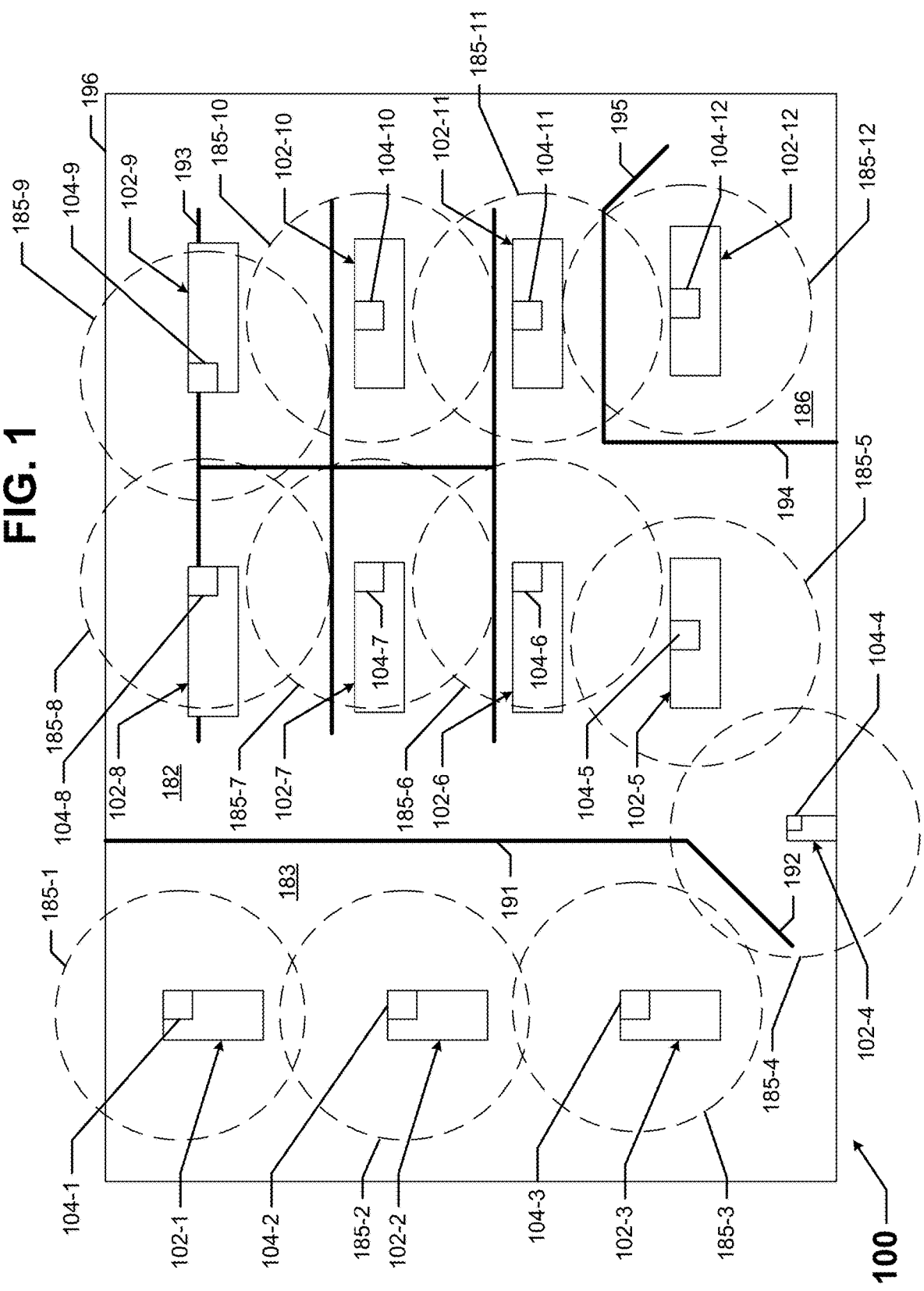
FIG. 1 shows an office space within a building in which example embodiments can be used.

In general, example embodiments provide systems, methods, and devices for secure remote control of integrated controls for electrical devices. Example embodiments can provide a number of benefits. Such benefits can include, but are not limited to, increased security, lower energy usage, increased reliability of electrical devices, effective energy management of light fixtures and other electrical devices in a space, improved safety, longer useful life of light fixtures and other electrical devices, reduced operating costs, and compliance with industry standards that apply to light fixtures and other electrical devices in certain environments.

Example embodiments are directed to secure remote control of integrated controls for any of a number of different types of electrical devices. Examples of such electrical devices can include, but are not limited to, a light fixture (a floodlight, a spot light, a can light, an emergency egress light), a speaker, a digital personal assistant, a wall outlet, a computer, a printer, a projector, a HVAC system (including, for example, a vent and a thermostat), a camera, a smoke detector, an electronic air freshener, a security sensor, automated window covering/tinting, and a $CO_2$ monitor.

Further, while example embodiments are described, by way of example herein, as being used in a building, example embodiments can also be used in other areas where electrical devices can be located. Such other areas can include, but are not limited to, a parking structure, a parking lot, a street, an outdoor stadium, inside a building (e.g., a home, an office), the yard of a home, a building exterior, and a park. Further, when applied to building environments, example embodiments can be used in any part of such building environments. Such parts of a building environment can include, but are not limited to, a small room (individual office, small conference room), a large room (large conference room), a break room, bathrooms, locker rooms, a corridor, a stairwell, an auditorium, a server room, an attic, a basement, a maintenance area, a manufacturing space, a shop floor, a storage room, an inventory space, and an arena.

When an electrical device includes a light fixture, the light fixture can use any type of light source (e.g., light-emitting diode (LED), incandescent, sodium vapor, fluorescent). When light sources use LED technology, one or more of any type of LED technology can be included, such as chip-on-board, discrete, arrays, and multicolor. Further, the light fixture can be any type of light fixture, including but not limited to a troffer light, a floodlight, a street light, a pendant light, a hi-bay light, a down can light, a floor light, a flood light, a parking lot light, a walkway light, and an emergency egress light.

In the foregoing figures showing example embodiments of controlling access for electrical systems, one or more of the components shown may be omitted, repeated, and/or substituted. Accordingly, example embodiments of controlling access for electrical systems should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits.

In certain example embodiments, light fixtures and/or other electrical devices used with example embodiments are subject to meeting certain standards and/or requirements. For example, the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the enclosures of electrical devices described herein.

Example embodiments of controlling access for electrical systems will be described more fully hereinafter with reference to the accompanying drawings, in which example embodiments of controlling access for electrical systems are shown. Controlling access for electrical systems may, however, be embodied in many different forms and should not be construed as limited to the example embodiments set forth herein. Rather, these example embodiments are provided so that this disclosure will be thorough and complete, and will fully convey the scope of controlling access for electrical systems to those of ordinary skill in the art. Like, but not necessarily the same, elements (also sometimes called components) in the various figures are denoted by like reference numerals for consistency.

Terms such as "first", "second", "third", and "within" are used merely to distinguish one component (or part of a component or state of a component) from another. Such terms are not meant to denote a preference or a particular orientation. Such terms are not meant to limit embodiments of controlling access for electrical systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system 100 of an office space inside a building in which example embodiments can be used. The system 100 of FIG. 1 includes at least one electrical device 102 in each of a number of adjoining rooms. Specifically, the hallway 183 of the office space, which is defined by multiple exterior walls 196, an interior wall 191, and a door 192, includes three ceiling-mounted electrical devices 102 (electrical device 102-1, electrical device 102-2, and electrical device 102-3) in the form of light fixtures. The office 186 of the work space 182 of FIG. 1, which is defined by multiple exterior walls 196, interior walls 194, and a door 195, includes a ceiling-mounted electrical device 102-12 in the form of a light fixture.

Entering the work space 182 of the office space of FIG. 1 through the door 192 is a ceiling-mounted electrical device 102-4 in the form of an illuminated exit sign. Inside the work space 182, which is defined by multiple exterior walls 196, interior wall 191, the interior walls 194, the door 192, and the door 195, there are seven ceiling-mounted electrical devices 102 (electrical device 102-5, electrical device 102-6, electrical device 102-7, electrical device 102-8, electrical device 102-9, electrical device 102-10, and electrical device 102-11). The system 100 can also have any of a number of other electrical devices (e.g., electrical outlets, cameras, printers, computers), but are not shown in FIG. 1 to make the features in FIG. 1 easier to distinguish.

Each electrical device 102 of FIG. 1 includes an example access controller 104. Specifically, electrical device 102-1 includes access controller 104-1, electrical device 102-2 includes access controller 104-2, electrical device 102-3 includes access controller 104-3, electrical device 102-4 includes access controller 104-4, electrical device 102-5 includes access controller 104-5, electrical device 102-6 includes access controller 104-6, electrical device 102-7 includes access controller 104-7, electrical device 102-8 includes access controller 104-8, electrical device 102-9 includes access controller 104-9, electrical device 102-10 includes access controller 104-10, electrical device 102-11 includes access controller 104-11, and electrical device 102-12 includes access controller 104-12. The access controller 104 is described in more detail below with respect to FIG. 2.

Each access controller 104 in FIG. 1 (or, more specifically, a sensor device (e.g., sensor device 275 discussed below with respect to FIG. 2) in communication with one or more access controllers 104) has a communication range 185, which defines a volume of space in which the access controller 104 can receive a control signal from a user or a user system, all of which is described in more detail below. In this case, access controller 104-1 has communication range 185-1, access controller 104-2 has communication range 185-2, access controller 104-3 has communication range 185-3, access controller 104-4 has communication range 185-4, access controller 104-5 has communication range 185-5, access controller 104-6 has communication range 185-6, access controller 104-7 has communication range 185-7, access controller 104-8 has communication range 185-8, access controller 104-9 has communication range 185-9, access controller 104-10 has communication range 185-10, access controller 104-11 has communication range 185-11, and access controller 104-12 has communication range 185-12.

A communication range 185 can be applied to one or more of any of a number of communication technologies, depending on the configuration of the particular example access controller 104 and/or the associated electrical device 102 and its components (e.g., one or more of the sensor devices). For example, a communication range 185 can be a line-of-sight in which the example access controller and/or a sensor device (e.g., a camera, a scanner) of the associated electrical device has with a user and/or a user system. In such a case, the line-of-sight communication range 185 can apply for communications in the form of, for example, one or a series of hand gestures, presentation of a face (e.g., for facial recognition, for recognition of a facial expression), transmission of a pattern of visible light, and a particular movement of a body part aside from the hands.

As another example, a communication range 185 can be an audible range within which the example access controller and/or a sensor device (e.g., a microphone) of the associated electrical device can hear a sound emitted from a user and/or a user system. In such a case, the audible communication range 185 can apply for communications in the form of, for example, one or a series of tones or sounds (e.g., a snippet of a song, a spoken phrase, a whistled series of tones) and recognition of a particular voice.

As yet another example, a communication range 185 can be a wireless signal receiving range within which the example access controller and/or a sensor device (e.g., an antenna) of the associated electrical device can receive a communication (e.g., a radio frequency (RF) signal) broadcast by a user system. In such a case, the communication broadcast by the user system can be received directly from the user system (e.g., user system 255 discussed below with respect to FIG. 2) or indirectly through one or more other electrical devices. For example, as shown in FIG. 1, each communication range 185 of an electrical device 102 intersects with the communication range 185 of at least one other electrical device 102.

As still another example, a communication range 185 can be one or multiple electrical conductors that electrically connect, directly or indirectly, an electrical device 102 to one or more other components (e.g., another electrical device 102, a user system) in the system 100. In such a case, the wired communication range 185 can receive a communication in the form of, for example, an electrical signal or series of electrical signals. For clarity, as expressed by the examples provided above, a communication discussed herein can be transmitted in one or more of a number of forms that can be transmitted using one or more of a number of communication technologies. Such a communication can sometimes be referred to herein as a signal or a communication signal.

In certain example embodiments, all of the electrical devices 102 can directly or indirectly communicate with each other when there are multiple electrical devices 102 as part of a system 100, as shown in FIG. 1. In such a case, if a communication specifically addressed to one of the electrical devices 102 (e.g., electrical device 102-12) in the system 100 is broadcast by a user device, the access controller 104 of that electrical device 102 will receive the communication, regardless of the location within the office space from which the communication is sent.

The range, shape, and/or other characteristics of a communication range 185 of an electrical device 102 can be adjusted (e.g., increased, decreased, shaped) relative to what is shown in FIG. 1. Such adjustments can be made, for example, by a user interacting with control devices, by a controller. The shape and size of a communication range 185 of an electrical device 102 can vary based on one or more of a number of factors, including but not limited to the communication technology (e.g., WiFi, visible light communication, line-of-sight, sound) being used, objects (e.g., walls, ceiling, desks, file cabinets) in the volume of space, and user settings. The communication range 185 of one electrical device 102 can be the same as, or different than, the communication range 185 of another electrical device 102 in the system 100. In some cases, an electrical device 102 can have multiple communication ranges 185, one for each type of technology used by the electrical device 102 to receive a communication from and/or send a communication to a user, another electrical device 102, and/or some other component (e.g., a network manager) of the system 100.

Figure 2:
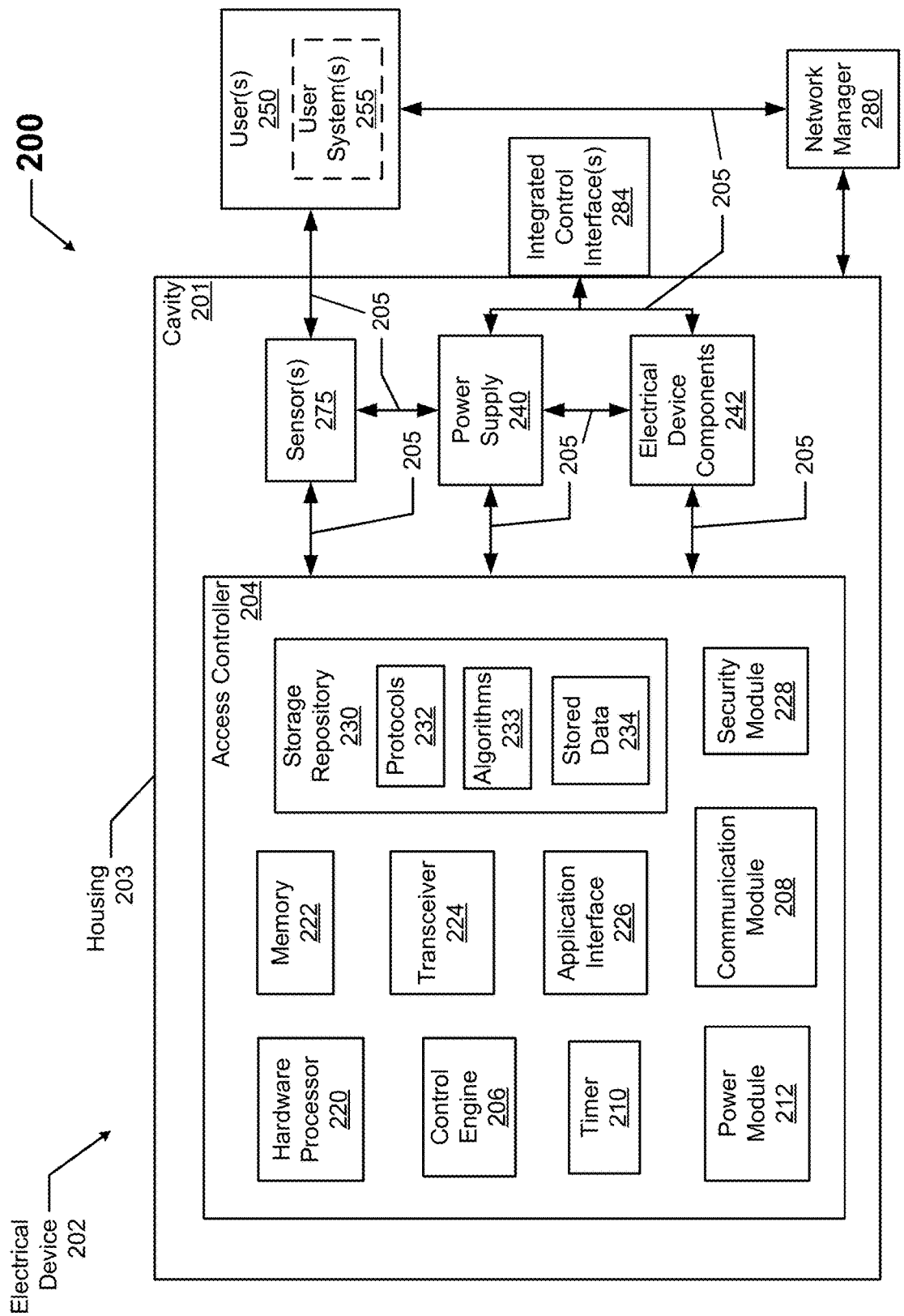
FIG. 2 shows a system in accordance with certain example embodiments.

FIG. 2 shows a system diagram of a system 200 that includes an access controller 204 of an electrical device 202 in accordance with certain example embodiments. The system 200 can also include one or more users 250 (which can include one or more optional user systems 255) and a network manager 280. In addition to the access controller 204, the electrical device 202 can include a power supply 240, one or more sensor devices 275, one or more electrical device components 242, and one or more integrated control interfaces 284. In some cases, the system 200 can include multiple electrical devices 202, where each electrical device 202 includes its own example access controller 204 or is communicably coupled to the electrical device 202 to share the access controller 204.

The access controller 204 can include one or more of a number of components. Such components, can include, but are not limited to, a control engine 206, a communication module 208, a timer 210, a power module 212, a storage repository 230, a hardware processor 220, a memory 222, a transceiver 224, an application interface 226, and a security module 228. The components shown in FIG. 2 are not exhaustive, and in some embodiments, one or more of the components shown in FIG. 2 may not be included in an example electrical device 202. Any component of the electrical device 202 can be discrete or combined with one or more other components of the electrical device 202. For example, one or more of the sensor devices 275 can be part of the access controller 204.

Referring to FIGS. 1 and 2, a user 250 may be any person that interacts with the electrical device 202 to securely and remotely access and interact with one or more of the controls of the integrated control interface 284. For example, the user 250, either directly or indirectly through the optional user system 255, can present his or her credentials to the example access controller 204 so that the access controller 204 can determine whether the user 250 has the authority to control, through the access controller 204, one or more of the functions (e.g., reset, mute volume) of the integrated control interface 284 of the electrical device 202 and, if so, the extent (limitations) of that authority.

Examples of a user 250 can include, but are not limited to, an employee, a supervisor, a visitor, a homeowner, a landlord, a tenant, a property manager, an engineer, an electrician, an instrumentation and controls technician, a mechanic, an operator, a consultant, a systems commissioner, a janitor, a vendor, a manager, a contractor, a visitor, and a manufacturer's representative. Each user 250 can include an optional user system 255 (also sometimes called a user device 255 herein). In such a case, the user system 255 can be used to communicate the credentials of the user 250 and/or a command to the example access controller 204. The user system 255 can include a user interface (e.g., a button) and/or an optional display (e.g., a GUI). In addition, or in the alternative, a user system 255 can include a component that can actively transmit or can be passively scanned. In some cases, a user system 255 can include a light source. Examples of a user system 255 can include, but are not limited to, a remote control, a hand-held transmitter, a personal computer (PC), a laptop, a passcard, a keycard, a key fob, a mobile phone with a flash, and a mobile phone with an app.

A user system 255 can include software (e.g., an app, a program) that allows a user 250 to communicate with the access controller 204. For example, the software on a user system 255 can allow a user 250 to present the credentials of the user 250 to the access controller 204, which can allow the authority of the user 250 to be authenticated by the access controller 204 based on the credentials of the user 250, and which can allow the user 250 to receive permission to control the associated electrical device 202 without touching the integrated control interface 242 of the electrical device 202. In addition, or in the alternative, such software can be included with the network manager 280. The signals sent by a user system 255 to the access controller 204 can be addressable, so that only the user 250 of the user system 255 is specifically identifiable and/or so that the communication signal sent by the user system 255 is received by one or more specifically identified electrical devices 202.

With the user system 255, the credentials of the user 250 can be presented to the access controller 204 in one or more of a number of forms, including but not limited to a QR code, a bar code, a visible light communication sequence, a sound or series of sounds, a radio frequency signal with a specific address, and a RF signal sent at a particular frequency. In such a case, the access controller 204 can be configured to receive these credentials and put the credentials in a format that is understood by the control engine 206 of the access controller 204. In the absence of a user system 255, a user 250 can present credentials in one or more of any of a number of ways, including but not limited to a spoken word or phrase, a voice print, a fingerprint, a retina, a face, and a particular gesture. In such a case, the access controller 204 can be configured to read these credentials and put the credentials in a format that is understood by the control engine 206 of the access controller 204. When multiple credentials (e.g., QR code and voice print) are presented, in some cases those credentials must be presented in a particular sequence with respect to each other.

In some cases, the user system 255 of a user 250 can also interact with (e.g., send data to, receive data from) the access controller 204 of the electrical device 202 via the application interface 226 (described below) using communication links 205. The user system 255 of a user 250 can also interact with one or more other electrical devices 202 and/or the network manager 280 using communication links 205.

As discussed above, interaction between the user system 255, the access controller 204 of the electrical device 202, and the network manager 280 is conducted using communication links 205. Each communication link 205 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a communication link 205 can be (or include) a wireless communication link between a user system 255 and the access controller 204.

A communication link 205 can transmit signals (e.g., power signals, communications, control signals, data) between the access controller 204 (and/or another component of the electrical device 202), a user system 255, one or more other electrical devices 202, and the network manager 280. One or more communication links 205 can also transmit signals between components (e.g., power module 212, control engine 206, storage repository 230) within the access controller 204 and/or between the access controller 204 and other components (e.g., a sensor device 275) of the electrical device 202.

The network manager 280 is a device or component that controls all or a portion of the system 200, which can include the access controller 204 of the electrical device 202, the user system 255 of a user 250, one or more other electrical devices 202 of the system 200, the network manager of another system, and some other component of the electrical device 202 that is communicably coupled to the network manager 280. The network manager 280 can perform functions and/or include components that are substantially similar to the access controller 204. Alternatively, the network manager 280 can include one or more of a number of features in addition to, or altered from, the features of the access controller 204 described below. As described herein, communication with the network manager 280 can include communicating with one or more other components (e.g., another network manager of another system). In such a case, the network manager 280 can facilitate such communication.

The network manager 280 can perform one or more particular functions in the system 200. For example, the network manager 280 can establish and/or update the credentials and authorization for each user 250, and this information can be sent by the network manager 280 to the access controller 204 for storage as stored data 234 in the storage repository 230. These communications can be made at regular time intervals, whenever a change is made (e.g., adding a new user 250, removing an existing user 250, updating the credentials of a user 250, updating the authorization of a user 250), randomly, or based on some other factor. The network manager 280 can be called by other names, including but not limited to the master controller, the network controller, and the control manager.

The electrical device 202 can be substantially the same as the electrical devices 102 described above with respect to FIG. 1. One or more components of the access controller 204 can be shared with one or more other electrical devices 202. For example, the access controller 204 of the electrical device 202 can also assess credentials of a user 250 and/or associated user system 255 relative to remotely controlling one or more other electrical devices in the system 200.

The integrated control interface 284 of the electrical device 202 allows for manual (not remote) control by a user 250 of certain functions (e.g., reset, mute) of one or more of the electrical device components 242 (e.g., speaker) and/or the power supply 240 of the electrical device 202. The integrated control interface 284 can be located on the housing 203 of the electrical device 202. Alternatively, the integrated control interface 284 can be integrated with the housing 203 of the electrical device 202. The integrated control interface 284 can be communicably coupled to one or more of the electrical device components 242 (e.g., speaker) and/or the power supply 240 using one or more communication links 205. In some cases, the integrated control interface 284 can be an optional component that is omitted from the electrical device 202.

The functions controlled by the integrated control interface 284 are typically separate from functions that can be controlled by a separate remote control device. For example, the functions that are not typically controlled by the integrated control interface 284 include turning on and off, changing a channel, selecting an input. Rather, functions that are typically controlled by the integrated control interface 284 include resetting the electrical device and, in some cases, mute/volume control.

The integrated control interface 284 can include one or more of any of a number of interface devices used to control one or more of the electrical device components 242 (e.g., speaker) and/or the power supply 240 of the electrical device 202. Examples of such interface devices can include, but are not limited to, a switch, a dial, a slider, a pushbutton, and a touchscreen. When these interface devices of the integrated control interface 284 are engaged, the integrated control interface 284 controls the one or more of the electrical device components 242 (e.g., speaker) and/or the power supply 240, regardless of who engages those interface devices. In other words, the integrated control interface 284 does not assess whether the user 250 engaging the integrated control interface 284 has the proper credentials to do so, and so anyone can control the electrical device 202 by directly engaging the integrated control interface 284.

This situation can have unintended negative consequences. For example, in some cases, the integrated control interface 284 of the electrical device 202 can be readily accessible. When the electrical device 202 is a security camera or some other device used for security of a structure (e.g. a home) or other property, and when the integrated control interface 284 of the electrical device 202 is a reset button, a person with criminal intent can press the reset button, and the electrical device 202 becomes disabled for some period of time.

In other cases, the electrical device 202 (and so also its integrated control interface 284) can be located at a high elevation or at some other location that is difficult to reach. If a user 250 wants to engage the integrated control interface 284, that user 250 will be unable to physically do so without the use of a ladder, an extension arm, and/or other equipment, which can become a time-consuming and inconvenient process. Also, while more difficult to engage, a person with criminal intent or other person without authorization can employ the same methods to access and engage the integrated control interface 284.

The power supply 240 of the electrical device 202 receives power from an external source (e.g., a wall outlet, an energy storage device). The power supply 240 uses the power it receives to generate and provide power of a type (e.g., alternating current, direct current) and level (e.g., 12V, 24V, 120V) that can be used by the power module 212 of the access controller 204, the one or more of the sensors 275, the integrated control interface 284, and/or one or more of the electrical device components 242. If the electrical device 202 is a light fixture, the power supply 240 can be called by any of a number of other names, including but not limited to a driver and a ballast. The power supply 240 can include one or more of a number of single or multiple discrete components (e.g., transistor, diode, resistor), and/or a microprocessor. The power supply 240 may include a printed circuit board, upon which the microprocessor and/or one or more discrete components are positioned, and/or a dimmer.

The power supply 240 can include one or more components (e.g., a transformer, a diode bridge, an inverter, a converter). The power supply can receive power through an electrical cable or other a communication link 205. In some cases, the power module 212 of the access controller 204 provides power to the power supply 240. In addition, or in the alternative, the power supply 240 can be or include a source of power in itself. For example, the power supply 240 can be or include be a battery, a localized photovoltaic solar power system, or some other source of independent power.

The electrical device components 242 of the electrical device 202 include one or more devices and/or components that are used in support of or in executing the function of the electrical device 202. An electrical device component 242 can be electrical, mechanical, electronic, electro-mechanical, or any other suitable format. The electrical device components 242 can vary, depending on what form the electrical device 202 takes. For example, if the electrical device 202 is a light fixture, then examples of electrical device components 242 can include, but are not limited to, a controller, a light source, a heat sink, a terminal block, a wire, a lens, a reflector, a bezel, an air moving device, a baffle, a circuit board, and an energy storage device.

The electrical device 202 can include one or more sensor devices 275. Each sensor device 275 can include one or more sensors that measure one or more parameters. The parameters measured by a sensor of a sensor device 275 may or may not directly be used by the access controller 204. The parameters can include, but are not limited to, light, motion, sound, images, RF signals, and color. In general, a parameter can be or can be included within a communication, as discussed below. Examples of types of sensors of a sensor device 275 can include, but are not limited to, a speaker, a microphone, an antenna, a camera, passive infrared sensor, and a photocell. Each sensor device 275 can use one or more of a number of protocols 232 for operations and/or communications. A sensor device 275 can be associated with the electrical device 202, the access controller 204, and/or one or more other electrical devices 202 in the system 200.

A sensor device 275 can receive power from one or more of any of a number of sources. For example, the power supply 240 of the electrical device 202 can provide power to a sensor device 275. As another example, a sensor device 275 can include an energy storage device (e.g., a battery) to provide power to the sensor device 275. As yet another example, an independent power supply (not associated with the electrical device 202) can provide power to the sensor device 275. As still another example, the power module 212 of the access controller 204 can provide power to the sensor device 275. In some cases, a sensor device 275 of the electrical device 202 can also be an electrical device component 242. For example, if the electrical device 202 is a security camera, then the camera can be a sensor device 275, used to receive a communication from a user 250 or user system 255, as well as an electrical device component 242.

If a sensor device 275 is a stand-alone device, the sensor device 275 can include its own housing and other components that are common with such stand-alone devices. In other alternative embodiments, a sensor device 275 can be attached to the outer surface of the housing 203 of the electrical device 202. In such a case, the sensor device 275 include at least a partial housing of its own. In yet other alternative embodiments, a sensor device 275 can be integrated with the housing 203 of the electrical device 202. The sensor device 275 can sometimes also more simply be called a sensor 275 herein, such as when the sensor device 275 is integrated with the housing 203 of the electrical device 202.

The electrical device 202 can include a housing 203. The housing 203 can include at least one wall that forms a cavity 201. In some cases, the housing 203 can be designed to comply with any applicable standards so that the electrical device 202 can be located in a particular environment. The housing 203 can take any form suitable for the electrical device 202. For example, when the electrical device 202 is a ceiling-mounted light fixture, the housing 203 can include a trim.

The housing 203 of the electrical device 202 can be used to house one or more components of the electrical device 202, including one or more components of the access controller 204. For example, as shown in FIG. 2, the access controller 204 (which in this case includes the control engine 206, the communication module 208, the timer 210, the power module 212, the storage repository 230, the hardware processor 220, the memory 222, the transceiver 224, the application interface 226, and the security module 228), the power supply 240, the sensor devices 275, and the electrical device components 242 are disposed in the cavity 201 formed by the housing 203, while the integrated control interface 284 is mounted on the housing 203. In alternative embodiments, any one or more of these or other components (e.g., a sensor device 275) of the electrical device 202 can be disposed on the housing 203 and/or remotely from the housing 203. Similarly, in alternative embodiments, the integrated control interface 284 can be disposed within the housing 203 or remotely from the housing 203.

In certain example embodiments, the access controller 204 controls the electrical device 202 in one or more of the same ways that the integrated control interface 284 can control the electrical device 202. If the access controller 204 controls multiple electrical devices 202, the access controller 204 can control the electrical devices 202 individually, as a subgroup, or as an entire group. The access controller 204 can control the electrical device 202 based on input (e.g., instructions, commands, communications) received from a user 250, either directly or through a user system 255. In some cases, this input is based on one or more parameters measured by one or more of the sensor devices 275.

In some cases, the access controller 204 can also have the capability to control the electrical device 202 in one or more ways that are not within the capability of the integrated control interface 284. In such a case, such other capabilities can be part of a controller among the electrical device components 242. In either case, the access controller 204 and its functionality to allow for remote control of the functions that are subject to control by the integrated control interface 284 can be used in retrofit applications for one or more existing electrical devices 202.

In some cases, the access controller 204, using the security module 228 and one or more protocols 232, identifies and verifies the credentials of a user 250 (or an associated user system 255) before changing the settings of or otherwise controlling the electrical device 202 based on the input received. In other words, the access controller 204 can determine whether the user 250 or associated user system 255 has the proper authority to change the settings of the electrical device 202 before actually changing the settings based on the instructions from the user 250 or associated user system 255.

A user system 255 of a user 250, the network manager 280, one or more of the sensor devices 275, the power supply 240, one or more other electrical devices 202, and/or one or more of the electrical device components 242 can interact with the access controller 204 of the electrical device 202 using the application interface 226 in accordance with one or more example embodiments. Specifically, the application interface 226 of the access controller 204 receives data (e.g., information, communications, instructions, updates to firmware) from and sends data (e.g., information, communications, instructions) to a user system 255 of a user 250, the network manager 280, one or more of the sensor devices 275, the power supply 240, one or more other electrical devices 202, and/or one or more of the electrical device components 242. A user system 255 of a user 250, the network manager 280, one or more of the sensor devices 275, the power supply 240, one or more other electrical devices 202, and/or one or more of the electrical device components 242 can include an interface to receive data from and send data to the access controller 204 in certain example embodiments.

The access controller 204, a user system 255 of a user 250, the network manager 280, one or more of the sensor devices 275, the power supply 240, one or more other electrical devices 202, and/or one or more of the electrical device components 242 can use their own system or share a system in certain example embodiments. Such a system can be, or contain a form of, an Internet-based or an intranet-based computer system that is capable of communicating with various software. A computer system includes any type of computing device and/or communication device, including but not limited to the access controller 204. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user software, access controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wired and/or wireless segments according to some example embodiments. The software of one system can be a part of, or operate separately but in conjunction with, the software of another system within the system 200.

The storage repository 230 of the access controller 204 can be a persistent storage device (or set of devices) that stores software and data used to assist the access controller 204 in communicating with a user system 255 of a user 250, the network manager 280, one or more of the sensor devices 275, the power supply 240, one or more other electrical devices 202, and/or one or more of the electrical device components 242 within the system 200. In one or more example embodiments, the storage repository 230 stores one or more protocols 232, one or more algorithms 233, and stored data 234. The protocols 232 can be one or more of any number of procedures (e.g., a series of method steps) and/or other similar operational procedures that the control engine 206 of the access controller 204 follows based on certain conditions at a point in time. An example of a protocol 232 is determining whether a particular user 250 has authority to control one or more particular electrical devices 202 at a particular point in time. Another example of a protocol 232 is determining which one or more electrical device components 242 and/or the power supply 240 should be controlled and the extent of such control.

One or more protocols 232 can be used by the control engine 206 to determine the contents of a communication received from a user 250 or a user system 255. Such contents can include, but are not limited to, identification of the user 250 or user system 255, a request to control the electrical device 202, the function of the electrical device 202 for which control is requested, and any conditions (e.g., time range, intervening events) associated with the request. One or more protocols 232 can also be used by the control engine 206 to determine whether the user 250 or user system 255 have the authority to make the requested control changes of the electrical device 202.

In some cases, one or more of the protocols 232 can also be used by the control engine 206 to determine whether the authority of a user 250 or a user system 255 is somehow limited and, if so, how those limits should be applied to the instruction to control the electrical device 202. In some cases, one or more of the protocols 232 can also be used by the control engine 206 to determine (e.g., through a hierarchy) how a conflict should be resolved between a current instruction and a requested instruction to control the same portion of the electrical device 202. In some cases, if more information is needed by the control engine 206, and if two-way communication is possible between the access controller 204 and the user 250/user system 255, one or more protocols 232 can be used by the control engine 206 to request such additional information from the user 250/user system 255.

The protocols 232 can include one or more protocols used for communication. The protocols 232 used for communication can be used to send and/or receive data between the access controller 204, a user system 255 of a user 250, the network manager 280, one or more of the sensor devices 275, the power supply 240, one or more other electrical devices 202, and/or one or more of the electrical device components 242. One or more of the protocols 232 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 232 used for communication can provide a layer of security to the data transferred within the system 200.

Another example of a protocol 232 is to check one or more communication links 205 with the network manager 280 and, if a communication link 205 is not functioning properly, allow the access controller 204 to operate autonomously from the rest of the system 200. As another example of a protocol 232, configurations of the access controller 204 can be stored in memory 222 (e.g., non-volatile memory) so that the access controller 204 (or portions thereof) can operate regardless of whether the access controller 204 is communicating with the network manager 280 and/or other components in the system 200. Yet another example of a protocol 232 is to have the access controller 204 operate in an autonomous control mode if one or more components (e.g., the communication module 208, the transceiver 224) of the access controller 204 that allows the access controller 204 to communicate with another component of the system 200 fails.

The algorithms 233 can be any models, formulas, and/or other similar operational implementations that the control engine 206 of the access controller 204 uses. An algorithm 233 can at times be used in conjunction with one or more protocols 232. Stored data 234 can be any historical, present, and/or forecast data. Stored data 234 can be associated with any component of or related to the system 200, including but not limited to the electrical device 202, the power supply 240, the access controller 204, the network manager 280, and the user system 255 of a user 250. Such stored data 234 can include, but is not limited to, hierarchies, authentications (credentials), permissions, settings, threshold values, default values, user preferences, and results of an algorithm.

Examples of a storage repository 230 can include, but are not limited to, a database (or a number of databases), a file system, a hard drive, flash memory, cloud-based storage, some other form of solid state data storage, or any suitable combination thereof. The storage repository 230 can be located on multiple physical machines, each storing all or a portion of the protocols 232, the algorithms 233, and/or the stored data 234 according to some example embodiments. Each storage unit or device can be physically located in the same or in a different geographic location.

The storage repository 230 can be operatively connected to the control engine 206. In some cases, the control engine 206 can also be configured to communicate with the user system 255 of a user 250, the network manager 280, the sensor devices 275, the power supply 240, one or more other electrical devices 202, and the electrical device components 242 in the system 200. As discussed below, the storage repository 230 can also be operatively connected to the communication module 208 in certain example embodiments.

In certain example embodiments, the control engine 206 of the access controller 204 controls the operation of one or more components (e.g., the communication module 208, the timer 210, the transceiver 224) of the access controller 204. For example, the control engine 206 can activate the communication module 208 when the communication module 208 is in "sleep" mode and when the communication module 208 is needed to send data received from another component (e.g., a user system 255, the network manager 280) in the system 200. As another example, the control engine 206 can operate the transceiver 224 to send a communication (e.g., notifying that a signal has been received from a user system 255) to another component (e.g., the network manager 280) in the system 200. As another example, the control engine 206 can acquire the current time using the timer 210. The timer 210 can enable the access controller 204 to control one or more of the electrical device components 242 and/or the power supply 240, even when the access controller 204 has no communication with the network manager 280.

As another example, the control engine 206 can check one or more communication links 205 between the access controller 204 and the network manager 280 and, if a communication link 205 is not functioning properly, allow the access controller 204 to operate autonomously from the rest of the system 200. As yet another example, the control engine 206 can store configurations of the access controller 204 (or portions thereof) in memory 222 (e.g., non-volatile memory) so that the access controller 204 (or portions thereof) can operate regardless of whether the access controller 204 is communicating with the network controller 280 and/or other components in the system 200.

As still another example, the control engine 206 can receive from a user 250 (or a user system 255) the credentials of the user 250 or user system 255, based on one or more communications provided by the user 250 (or the user system 255) to the control engine 206 (in some cases, through one or more sensor devices 275). Upon receiving these communications, the control engine 206 can identify the particular user 250/user system 255 associated with those credentials and retrieve the authorization information associated with that user 250/user system 255. In such a case, the authorization information can be part of the stored data 234 in the storage repository 230. Upon receiving the authorization information of the user 250/user system 255, the control engine 206 can use one or more protocols 232 and/or algorithms 233 to determine whether the user 250/user system 255 is authorized to control any or all of the electrical device components 242 and/or the power supply 240 of the electrical device 202.

If the control engine 206 determines that a user 250 or associated user system 255 has authorization to control some or all of the electrical device components 242 and/or the power supply 240 of the electrical device 202, then the control engine 206 of the access controller 204 can control the electrical device components 242 and/or the power supply 240 of the electrical device 202, based on instructions embedded in the one or more communications received from the user 250/user system 255. On the other hand, if the control engine 206 determines that a user 250 or associated user system 255 does not have authorization to control any of the electrical device components 242 and/or the power supply 240 of the electrical device 202, then the control engine 206 of the access controller 204 can ignore the control instructions embedded in the one or more communications received from the user 250/user system 255.

In some cases, the authorization can be specific as to how a particular electrical device component 242 and/or the power supply 240 can be controlled by a user 250 or associated user system 255. In such a case, the control engine 206 can determine these limitations based on stored data 234 stored in the storage repository 230. For example, a user 250 or associated user system 255 may be authorized to control only a reset function of the power supply 240 of the electrical device 202, and then only between the hours of 6:00 p.m. until 10:30 p.m. on weekdays. In such a case, the control engine 206 retrieves these limitations from the storage repository 230 and, using one or more protocols 231 and/or algorithms 232, determines whether the ignore or act on a control instruction embedded in a communication received from a particular user 250 or user system 255.

In addition, the authorization of one particular user 250 or associated user system 255 can be superseded by the authorization of another particular user 250 or associated user system 255. In such a case, if instructions to control the electrical device 202 are provided by multiple users 250 and/or user systems 255 during a period of time, then the control engine 206, using one or more protocols 232 and/or one or more algorithms 233, can determine the hierarchy of the users 250 and/or user systems 255 and control the electrical device 202 based on which user 250/user system 255 is given priority to control the electrical device 202 at that point in time.

The control engine 206 can determine that a user 250 or associated user system 255 is authorized to control certain electrical devices (e.g., light fixtures) in one system (e.g., a lighting system), but not other electrical devices (e.g., a camera) in another system (e.g., a security system). Other limitations on the authorization of a user 250 or associated user system 255 can include, but are not limited to, time of day, day of week, holidays, business hours, sunrise/sunset, weather, location of certain electrical devices 202, occupancy at the time, and location of the user 250 or user device 255.

In some cases, all of the information used by the control engine 206 to securely allow for remote control of an electrical device 202 (or portion thereof) is provided to the control engine 206 (e.g., from a user 250, from the network manager 280, from a manufacturer). In other cases, at least some of the information used by the control engine 206 to securely allow for remote control of an electrical device 202 is generated by the control engine 206. For example, the control engine 206 can generate and deliver a series of tones that are unique to a user 250 or a user system 255, and this series of tones must be communicated to the control engine 206 in order for the control engine 206 to allow for remote control of an electrical device 202 by the user 250 or user system 255.

In certain example embodiments, the control engine 206 can determine the control instructions requested by a user 250 or associated user system 255. Such determination can be based on one or more of a number of factors, including but not limited to the content of the communication, the user 250 or associated user device 255, the method by which the communication is transmitted, and the time of day that the communication is transmitted. The control instruction of a communication can be identical to that implemented by physically enabling an integrated control interface 284. In addition, or in the alternative, the control instruction of a communication can disable an integrated control interface 284.

For example, if a communication received by the control engine 206 of the access controller 204 instructs the electrical device 204 to be reset, then the control engine 206 can also disable (e.g., for a period of time, until receipt of a subsequent communication) the integrated control interface 284 that performs that same function when physically engaged. In this way, once the access controller 204 has been engaged to perform a certain function upon receipt of a communication from a user 250 or user device 255, as a security measure, the control engine 206 can take action to disable the corresponding integrated control interface 284 to prevent a security breach or other adverse condition from occurring.

All of these actions taken by the control engine 206 can be based on one or more protocols 232 and/or using one or more algorithms 233. In addition, the actions taken by the control engine 206 can be performed in substantially real time. For example, the amount of time from receiving the credentials of a user 250 or associated user system 255, to determining the authorization of the user 250 or associated user system 255, to following the instructions to control the electrical device 202 can take less than a second or two, allowing for such factors as processing time and signal transfer time.

The control engine 206 of the access controller 204 can provide control, communication, and/or other similar signals to a user system 255 of a user 250, the network manager 280, one or more of the sensor devices 275, the power supply 240, one or more other electrical devices 202, and/or one or more of the electrical device components 242. Similarly, the control engine 206 can receive control, communication, and/or other similar signals from a user system 255 of a user 250, the network manager 280, one or more of the sensor devices 275, the power supply 240, one or more other electrical devices 202, and/or one or more of the electrical device components 242. The control engine 206 can control one of its components (e.g. the transceiver 224) automatically (for example, based on one or more protocols 232 stored in the storage repository 230) and/or based on control, communication, and/or other similar signals received from another device (e.g., the network manager 280) through a communication link 205. The control engine 206 may include a printed circuit board, upon which the hardware processor 220 and/or one or more discrete components of the access controller 204 are positioned.

In certain example embodiments, the control engine 206 can include an interface that enables the control engine 206 to communicate with one or more of the electrical device components 242 and the power supply 240. For example, when the electrical device 202 is a light fixture, if the power supply 240 operates under IEC Standard 62386, then the power supply 240 can include a digital addressable lighting interface (DALI). In such a case, the control engine 206 can also include a DALI to enable communication with the power supply 240. Such an interface can operate in conjunction with, or independently of, the protocols 232 used to communicate between the access controller 204 a user system 255 of a user 250, the network manager 280, one or more of the sensor devices 275, the power supply 240, one or more other electrical devices 202, and/or one or more of the electrical device components 242.

The control engine 206 (or other components of the access controller 204) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 208 of the access controller 204 determines and implements the communication protocol (e.g., from the protocols 232 of the storage repository 230) that is used when the control engine 206 communicates with (e.g., sends signals to, receives signals from) a user system 255 of a user 250, the network manager 280, one or more of the sensor devices 275, the power supply 240, one or more other electrical devices 202, and/or one or more of the electrical device components 242. In some cases, the communication module 208 accesses the stored data 234 to determine which communication protocol is used to communicate with the network manager 280. In addition, the communication module 208 can interpret the protocol 232 of a communication received by the access controller 204 so that the control engine 206 can interpret the communication.

The communication module 208 can send and receive data between a user system 255 of a user 250, the network manager 280, one or more of the sensor devices 275, the power supply 240, one or more other electrical devices 202, one or more of the electrical device components 242, and the access controller 204. The communication module 208 can send and/or receive data in a given format that follows a particular protocol 232. The control engine 206 can interpret the data packet received from the communication module 208 using the protocol 232 information stored in the storage repository 230. The control engine 206 can also facilitate the data transfer between a user system 255 of a user 250, the network manager 280, one or more of the sensor devices 275, the power supply 240, one or more other electrical devices 202, and/or one or more of the electrical device components 242 by converting the data into a format understood by the communication module 208.

The communication module 208 can send data (e.g., protocols 232, algorithms 232, stored data 234, authority of a user 250, credentials of a user 250, operational information, error codes, threshold values) directly to and/or retrieve data directly from the storage repository 230. Alternatively, the control engine 206 can facilitate the transfer of data between the communication module 208 and the storage repository 230. The communication module 208 can also provide encryption to data that is sent by the access controller 204 and decryption to data that is received by the access controller 204. The communication module 208 can also provide one or more of a number of other services with respect to data sent from and received by the access controller 204. Such services can include, but are not limited to, data packet routing information and procedures to follow in the event of data interruption.

The timer 210 of the access controller 204 can track clock time, intervals of time, an amount of time, and/or any other measure of time. The timer 210 can also count the number of occurrences of an event, whether with or without respect to time. Alternatively, the control engine 206 can perform the counting function. The timer 210 is able to track multiple time measurements concurrently. The timer 210 can track time periods based on an instruction received from the control engine 206, based on an instruction received from the network manager 280, based on an instruction programmed in the software for the access controller 204, based on some other condition or from some other component of the system 200, or from any combination thereof.

The timer 210 can be configured to track time when there is no power delivered to the access controller 204 (e.g., the power module 212 malfunctions) using, for example, a super capacitor or a battery backup. In such a case, when there is a resumption of power delivery to the access controller 204, the timer 210 can communicate any aspect of time to the access controller 204. In such a case, the timer 210 can include one or more of a number of components (e.g., a super capacitor, an integrated circuit) to perform these functions.

The power module 212 of the access controller 204 provides power to one or more other components (e.g., timer 210, control engine 206) of the access controller 204. In addition, in some cases, the power module 212 can provide power (e.g., secondary power) to the power supply 240. The power module 212 can include one or more of a number of single or multiple discrete components (e.g., transistor, diode, resistor), and/or a microprocessor. The power module 212 may include a printed circuit board, upon which the microprocessor and/or one or more discrete components are positioned. In some cases, the power module 212 can include one or more components that allow the power module 212 to measure one or more elements of power (e.g., voltage, current) that is delivered to and/or sent from the power module 212.

The power module 212 can include one or more components (e.g., a transformer, a diode bridge, an inverter, a converter) that receives power (for example, through an electrical cable) from the power supply 240 and/or another source external to the access controller 204. The power module 212 can use this power to generate power of a type (e.g., alternating current, direct current) and level (e.g., 12V, 24V, 120V) that can be used by the other components of the access controller 204. In addition, or in the alternative, the power module 212 can be or include a source of power in itself to provide signals to the other components of the access controller 204 and/or the power supply 240. For example, the power module 212 can be or include a battery or other form of energy storage device. As another example, the power module 212 can be a localized photovoltaic solar power system.

The hardware processor 220 of the access controller 204 executes software, algorithms (e.g., algorithms 233), and firmware in accordance with one or more example embodiments. Specifically, the hardware processor 220 can execute software on the control engine 206 or any other portion of the access controller 204. The hardware processor 220 can be an integrated circuit, a central processing unit, a multi-core processing chip, SoC, a multi-chip module including multiple multi-core processing chips, or other hardware processor in one or more example embodiments. The hardware processor 220 is known by other names, including but not limited to a computer processor, a microprocessor, and a multi-core processor.

In one or more example embodiments, the hardware processor 220 executes software instructions stored in memory 222. The memory 222 includes one or more cache memories, main memory, and/or any other suitable type of memory. The memory 222 can include volatile and/or non-volatile memory. The memory 222 is discretely located within the access controller 204 relative to the hardware processor 220 according to some example embodiments. In certain configurations, the memory 222 can be integrated with the hardware processor 220.

In certain example embodiments, the access controller 204 does not include a hardware processor 220. In such a case, the access controller 204 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the access controller 204 (or portions thereof) to be programmable and function according to certain logic rules and thresholds without the use of a hardware processor. Alternatively, FPGAs, IGBTs, ICs, and/or similar devices can be used in conjunction with one or more hardware processors 220.

The transceiver 224 of the access controller 204 can send and/or receive control signals and/or communications. Specifically, the transceiver 224 can be used to transfer data between the access controller 204, a user system 255 of a user 250, the network manager 280, one or more of the sensor devices 275, the power supply 240, one or more other electrical devices 202, and one or more of the electrical device components 242. The transceiver 224 can use wired and/or wireless technology. The transceiver 224 can be configured in such a way that the control signals and/or communications sent and/or received by the transceiver 224 can be received and/or sent by another transceiver that is part of a user system 255 of a user 250, the network manager 280, one or more of the sensor devices 275, the power supply 240, one or more other electrical devices 202, and/or one or more of the electrical device components 242. The transceiver 224 can use any of a number of signal types, including but not limited to sound, RF signals, and visible light signals. The transceiver 224 can in some cases use one or more sensor devices 275 (e.g., a speaker, a microphone) to send and/or receive signals (e.g., communications).

When the transceiver 224 uses wireless technology, any type of wireless technology can be used by the transceiver 224 in sending and receiving signals. Such wireless technology can include, but is not limited to, Wi-Fi, Zigbee, visible light communication, cellular networking, Bluetooth Low Energy, and Bluetooth. The transceiver 224 can use one or more of any number of suitable protocols 232 for communication (e.g., ISA100, HART) when sending and/or receiving signals (e.g., communications). Such communication protocols can be stored in the protocols 232 of the storage repository 230. Further, any transceiver information for a user system 255 of a user 250, the network manager 280, one or more of the sensor devices 275, the power supply 240, one or more other electrical devices 202, and/or one or more of the electrical device components 242 can be part of the protocols 232 (or other areas) of the storage repository 230.

In certain example embodiments, the security module 228 secures interactions between the access controller 204, a user system 255 of a user 250, the network manager 280, one or more of the sensor devices 275, the power supply 240, one or more other electrical devices 202, and/or one or more of the electrical device components 242. More specifically, the security module 228 authenticates communication from another component of the system 200, such as credentials of a user 250 and software based on security keys verifying the identity of the source of the communication. For example, user software may be associated with a security key enabling the software of the network manager 280 to interact with the access controller 204. Further, the security module 228 can restrict receipt of information, requests for information, and/or access to information in some example embodiments.

As stated above, the electrical device 202 can be placed in any of a number of environments. In such a case, the housing 203 of the electrical device 202 can be configured to comply with applicable standards for any of a number of environments. For example, the electrical device 202 can be rated as a Division 1 or a Division 2 enclosure under NEC standards. Similarly, any of the devices (e.g., a user system 255) communicably coupled to the access controller 204 can be configured to comply with applicable standards for any of a number of environments.

Figure 3:
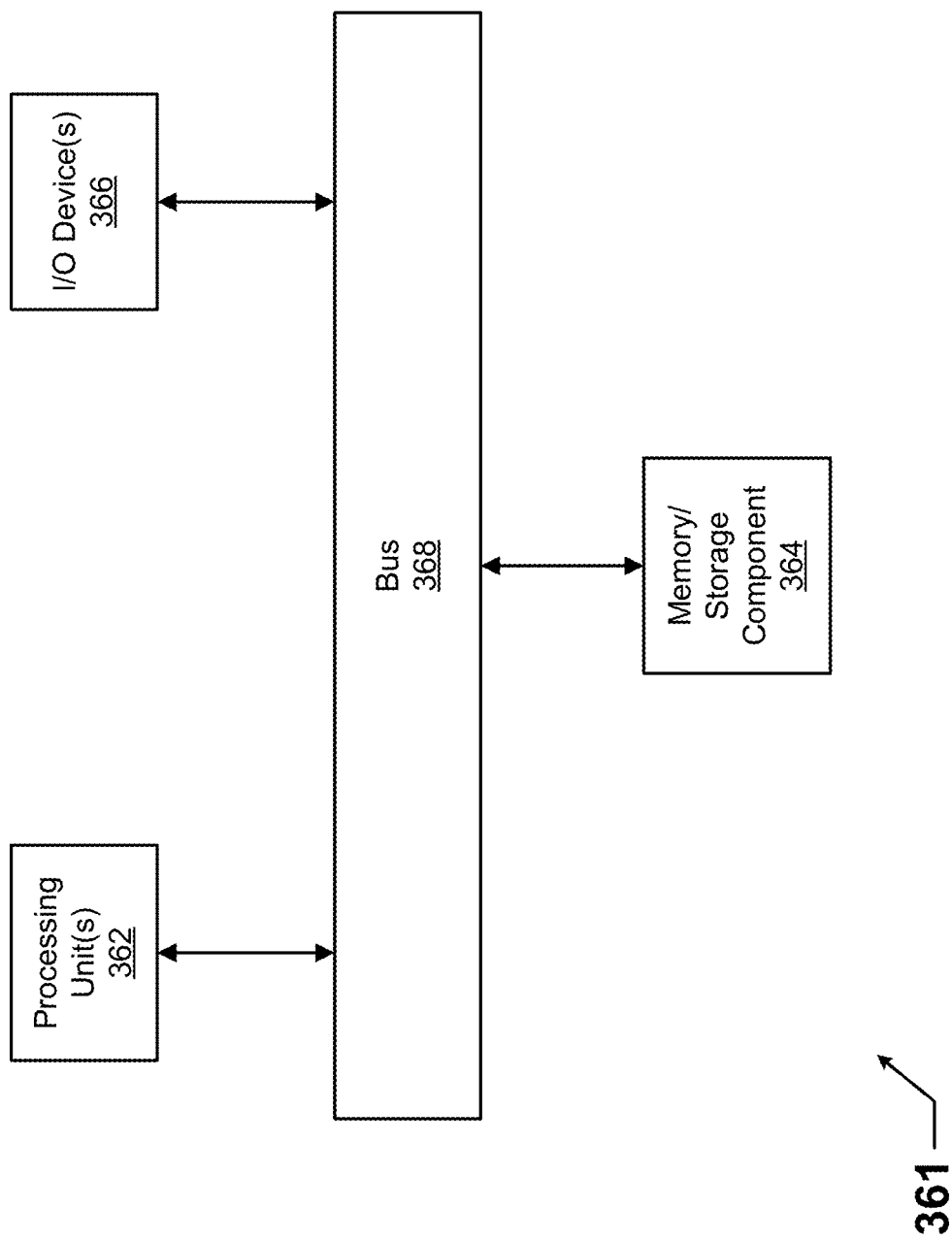
FIG. 3 shows a computing device in accordance with certain example embodiments.

FIG. 3 illustrates one embodiment of a computing device 361 that implements one or more of the various techniques described herein, and which is representative, in whole or in part, of the elements described herein pursuant to certain exemplary embodiments. For example, the access controller 204 of FIG. 2 (including components thereof, such as the control engine 206, the hardware processor 220, the storage repository 230, and the transceiver 224) can be considered a computing device 361. Computing device 361 is one example of a computing device and is not intended to suggest any limitation as to scope of use or functionality of the computing device and/or its possible architectures. Neither should computing device 361 be interpreted as having any dependency or requirement relating to any one or combination of components illustrated in the example computing device 361.

Computing device 361 includes one or more processors or processing units 362, one or more memory/storage components 364, one or more input/output (I/O) devices 366, and a bus 368 that allows the various components and devices to communicate with one another. Bus 368 represents one or more of any of several types of bus structures, including a memory bus or memory controller, a peripheral bus, an accelerated graphics port, and a processor or local bus using any of a variety of bus architectures. Bus 368 includes wired and/or wireless buses.

Memory/storage component 364 represents one or more computer storage media. Memory/storage component 364 includes volatile media (such as random access memory (RAM)) and/or nonvolatile media (such as read only memory (ROM), flash memory, optical disks, magnetic disks, and so forth). Memory/storage component 364 includes fixed media (e.g., RAM, ROM, a fixed hard drive, etc.) as well as removable media (e.g., a Flash memory drive, a removable hard drive, an optical disk, and so forth).

One or more I/O devices 366 allow a customer, utility, or other user to enter commands and information to computing device 361, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 361 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 361 includes at least the minimal processing, input, and/or output means necessary to practice one or more embodiments.

Further, those skilled in the art will appreciate that one or more elements of the aforementioned computer device 361 is located at a remote location and connected to the other elements over a network in certain exemplary embodiments. Further, one or more embodiments is implemented on a distributed system having one or more nodes, where each portion of the implementation (e.g., control engine 306) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 4:
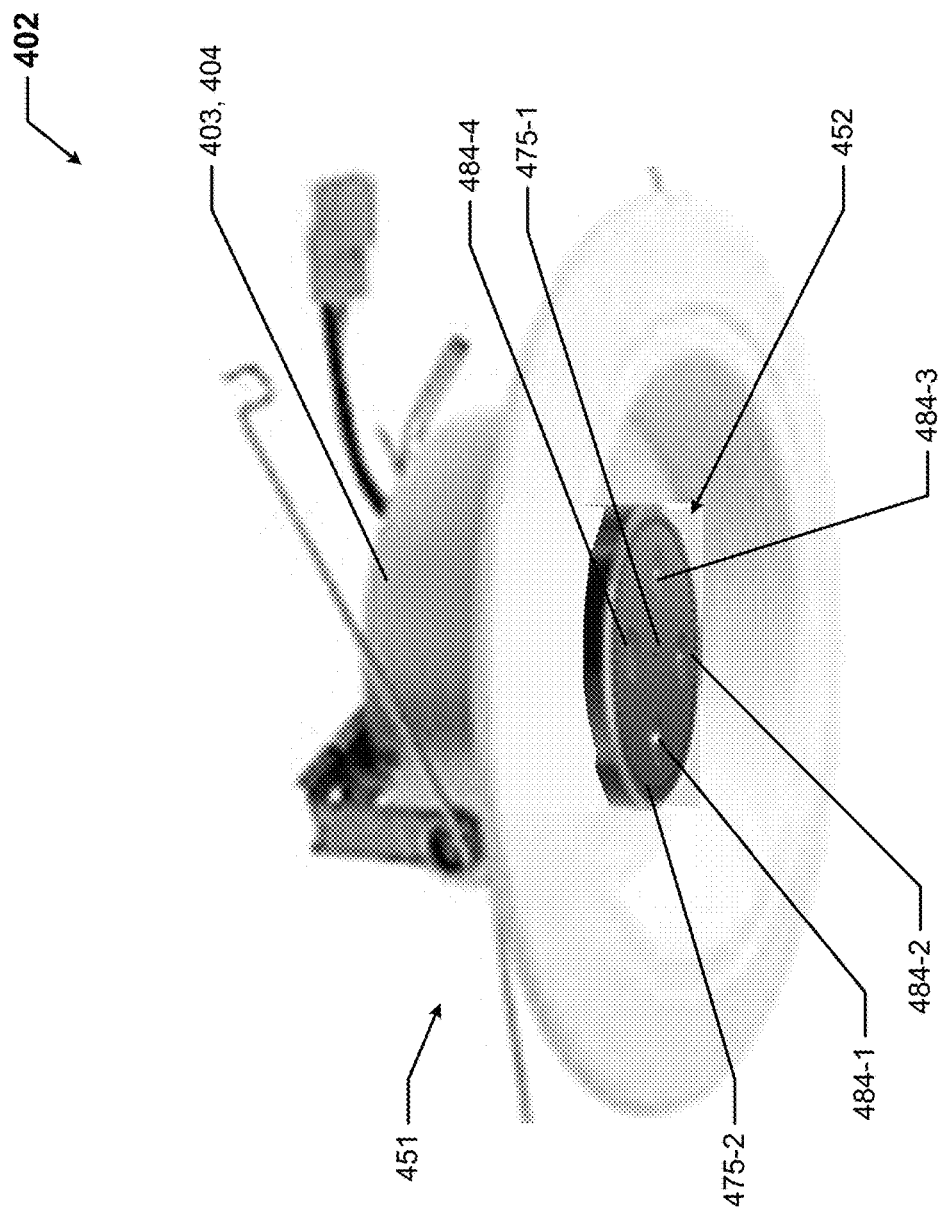
FIG. 4 shows an electrical device in accordance with certain example embodiments.

FIG. 4 shows an electrical device 402 in accordance with certain example embodiments. Referring to FIGS. 1 through 4, the electrical device 402 in this case includes a voice-activated personal assistant 452 integrated with a down can light fixture 451. The voice-activated personal assistant 452 portion of the electrical device 402 has an outer surface on which are disposed four integrated control interfaces 484 (integrated control interface 484-1, integrated control interface 484-2, integrated control interface 484-3, and integrated control interface 484-4) and two sensors 475 (sensor 475-1 and sensor 475-2). The various components of the electrical device 402 can be substantially the same as the corresponding components of the electrical device 202 of FIG. 2 above. In some cases, the voice-activated personal assistant 452 and the light fixture 451 can each be considered as electrical device components (e.g., electrical device components 242).

In this case, the integrated control interface 484-1 is a button that mutes the volume. The integrated control interface 484-2 is a button that increases the volume. The integrated control interface 484-3 is a button that decreases the volume. The integrated control interface 484-4 is a button that turns the power to the voice-activated personal assistant 452 on and off when briefly pressed and that resets the voice-activated personal assistant 452 when pressed for an extended time (e.g., at least 3 seconds). Sensor 475-1 is a microphone, and sensor 475-2 is a speaker.

The integrated control interfaces 484 of the electrical device 402 are normally out of reach to a user (e.g., user 250) because the electrical device 402 is mounted in a ceiling of a room, and so the user is unable to physically engage the integrated control interfaces 484 without assistance (e.g., use of a ladder, use of a pole), which can be dangerous and/or inconvenient for the user. While control for some of the integrated control interfaces 484 (e.g., integrated control interface 484-1 to mute the volume, integrated control interface 484-2 to increase the volume, integrated control interface 484-3 to decrease the volume) may be performed remotely (e.g., using an app on a user system 255), other integrated control interfaces 484 (e.g., integrated control interface 484-4 to reset the voice-activated personal assistant 452 portion and/or the entire electrical device 402) are not able to be controlled remotely. To resolve this issue, example embodiments are used. Specifically, the electrical device 402 includes an example access controller 404 (substantially similar to the access controller 204 of FIG. 2 above) that is disposed within the housing 403 of the electrical device 402. In alternative embodiments, the access controller 404 can be remotely located from the housing 403 but communicably coupled to one or more of the electrical device components (e.g., electrical device components 242) of the electrical device 402.

As discussed above with respect to the access controller 204 of FIG. 2, the access controller 404 of the electrical device 402 of FIG. 4 can be used to receive one or more communications from a user (e.g., user 250) or a user system (e.g., user system 250), as discussed below with respect to FIG. 5. When these communications are received by the access controller 404 of the electrical device 402, the access controller 404 can perform one or more of a number of functions, including but not limited to interpreting the content of the communication, validating the credentials of the user identified in the communication, validating that the identification of the electrical device (or portion thereof) that is the subject of the communication matches the identification of the electrical device 402, validating whether the credentialed user has superior authority to control the electrical device 402 in the event of a conflict, and/or controlling one or more of the electrical device components (e.g., electrical device components 242) and/or the power supply (e.g., power supply 240) of the electrical device 402 according to the communication.

In this particular example, the access controller 404 of the electrical device 402 can mute the sound emitted from the speaker (sensor 475-2) of the voice-activated personal assistant 452 of the electrical device 402, increase or decrease the volume of sound emitted from the speaker (sensor 475-2) of the voice-activated personal assistant 452 of the electrical device 402, turn the voice-activated personal assistant 452 of the electrical device 402 on or off, and/or reset the voice-activated personal assistant 452 of the electrical device 402 based on a communication received from a user or user system.

Figure 5:
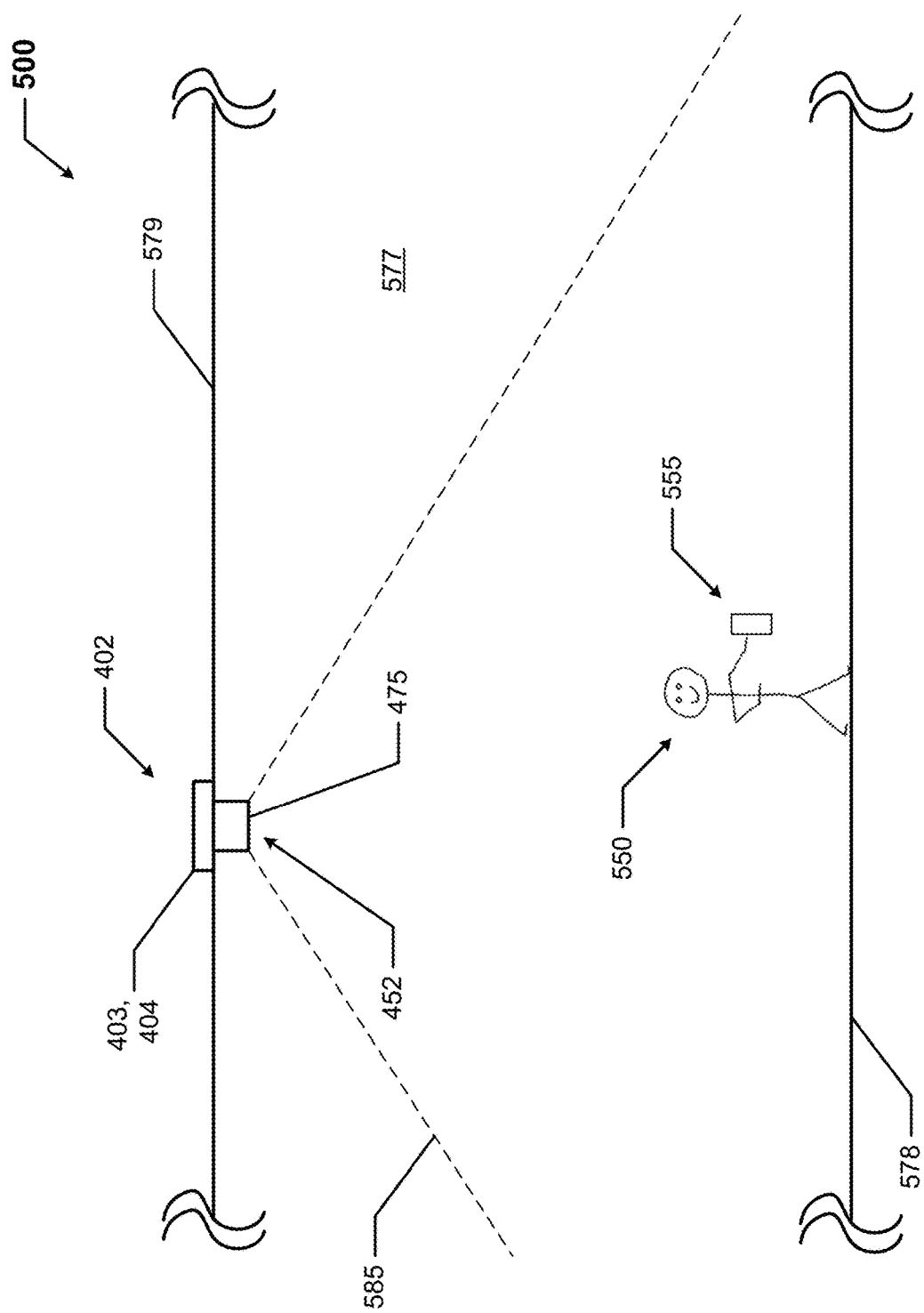
FIG. 5 shows a system for remotely controlling the electrical device of FIG. 4 in accordance with certain example embodiments.

FIG. 5 shows a system 500 for remotely controlling the electrical device 402 of FIG. 4 in accordance with certain example embodiments. Referring to FIGS. 1 through 5, the system 500 of FIG. 5 has the electrical device 402 of FIG. 4 mounted in a ceiling 579 within a volume of space 577 (e.g., a room). A user 550 in this case is walking on a floor 578 within the volume of space 577 somewhat under the electrical device 402 and is carrying a user system 555 (e.g., a mobile device) in his hand.

Part of the voice-activated personal assistant 452, including a surface on which the four integrated control interfaces 484 (integrated control interface 484-1, integrated control interface 484-2, integrated control interface 484-3, and integrated control interface 484-4) are disposed, is visible to the user 550, but the height of the ceiling 579 relative to the floor 578 is too great for the user 550 to practically or, in some cases, safely reach the integrated control interfaces 484 of the electrical device 402 to have physical interaction with the integrated control interfaces 484. While in some cases control for some of the functions controlled by one or more of the integrated control interfaces 484 can be replicated in some currently-known mode of remote control (e.g., using an app on the user system 555, having a dedicated physical remote control), these solutions are not always reliable and/or secure. In addition, or in the alternative, one or more of these functions (e.g., resetting some or all of the electrical device 402) are not available using such currently-known modes of remote control.

For example, use of an app requires Internet service and working WiFi capability, which is not always reliable. As another example, with a dedicated remote control, anyone can use the remote control to control the electrical device 402. In such a case, someone with criminal intent could disable the electrical device using the remote control, contrary to a security measure that certain users (e.g., user 550) want to maintain. As yet another example, the communication range 585 available to receive signals from such dedicated remote control may be limited and inconvenient. As still another example, some functions of electrical devices can be controlled by using an often complicated sequence of codes that are too complicated and too infrequently used to be memorized, and a reference that lists such sequence of codes can be difficult and time-consuming to retrieve and may not be secure (e.g., can be found and used by others).

In this case, using example embodiments, the access controller 404 is in communication with four sensors 475 disposed on the housing 403 of the electrical device 402. Each of these sensors 475 of the electrical device 402 has a communication range 585, similar to the communication ranges 185 discussed above with respect to FIG. 1. If the user 550 or the user system 555 is within the communication range 585 and sends a communication to the access controller 404, the communication will be received by the access controller 404 through one or more of the sensors 475.

As discussed above, if the communication generated by the user 550 or the user system 555 is received by the access controller 404, then the access controller 404 can control one or more functions of the electrical device 402 in the same way that the user 550 can control these functions by physically interacting with the integrated control interface 484 of the electrical device 402. In addition, the access controller 404, prior to controlling the functions of the electrical device 402 based on the communication, can perform one or more of a number of other threshold determinations, including but not limited to identifying the user 550 or associated user device 555, determining whether the user 550 or associated user device 555 have the authority to make the requested changes to the electrical device 402, and determining whether a conflict exists between the instructions in the communication and other instructions received from another user and, if so, how to resolve the conflict.

As discussed above, there are a number of different ways that a communication can be sent. For instance, if the user 550 (as opposed to the associated user device 555) is sending the communication, examples of how the communication can be sent can include, but are not limited to, the user 550 speaking (e.g., for voice printing), the user 550 speaking a specific word or phrase, the user 550 making a specific gesture, the user 550 presenting his/her face to one of the sensor devices 475 (e.g., a camera) of the voice-activated personal assistant 452, and the user 550 showing an image or series of images to one of the sensor devices 475 (e.g., a scanner, a camera) of the voice-activated personal assistant 452.

Alternatively, if a user system 555 is sending the communication, examples of how the communication can be sent can include, but are not limited to, the user system 555 generating and presenting a QR code to one of the sensor devices 475 (e.g., a scanner, a camera) of the voice-activated personal assistant 452, generating and presenting a bar code to one of the sensor devices 475 (e.g., a scanner, a camera) of the voice-activated personal assistant 452, emitting a sequence of light signals (e.g., visible light communication) from within the communication range 585 of a sensor device 475 toward the voice-activated personal assistant 452, generating and emitting a unique audio sound or series of sounds from within the communication range 585 of a sensor device 475 (e.g., a microphone) toward the voice-activated personal assistant 452, and generating and sending a RF signal from within the communication range 585 of a sensor device 475 (e.g., an antenna) toward the voice-activated personal assistant 452.

The type of communication sent by a user 550 and/or a user system 555 can be based on one or more of a number of factors, including but not limited to the types of sensor technology used by the sensors 475 of the electrical device 402, the communication range 585 of the various sensors 475 used to receive communications, and the frequency of updates to changes in data related to a user 550 and/or a user system 555. For example, if the electrical device 402 has a sensor 475 in the form of a camera, then some non-exclusive ways to broadcast a communication by a user 550 or a user system 555 can include presenting the face of the user 550 to the camera within the associated communication range 585, making gestures by the user 550 to the camera within the associated communication range 585, and presenting a QR code on a display of a user system 555 to the camera within the associated communication range 585.

Figure 6:
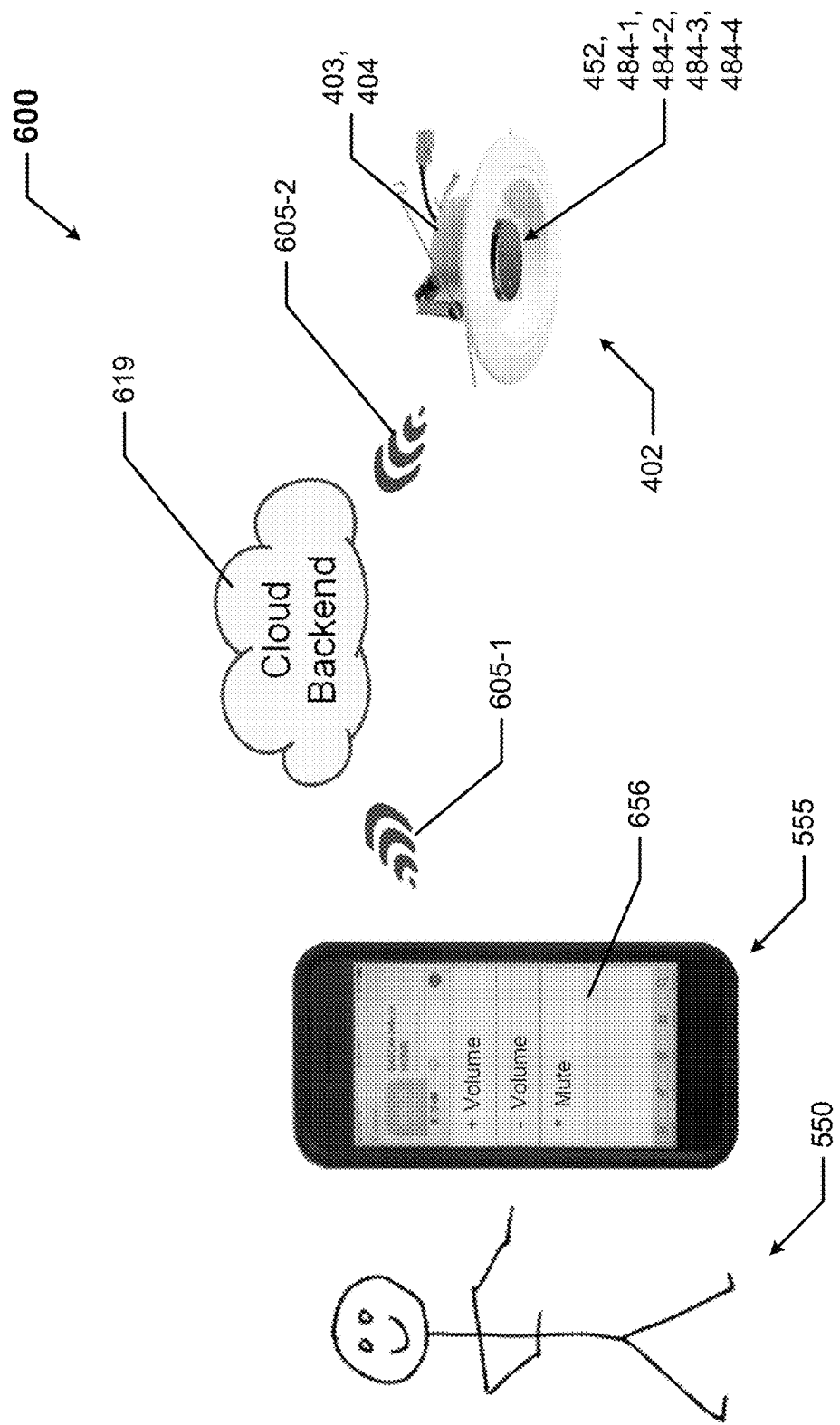
FIGS. 6 and 7 show a system for remotely controlling the electrical device of FIG. 4 in accordance with the current art.
Figure 7:
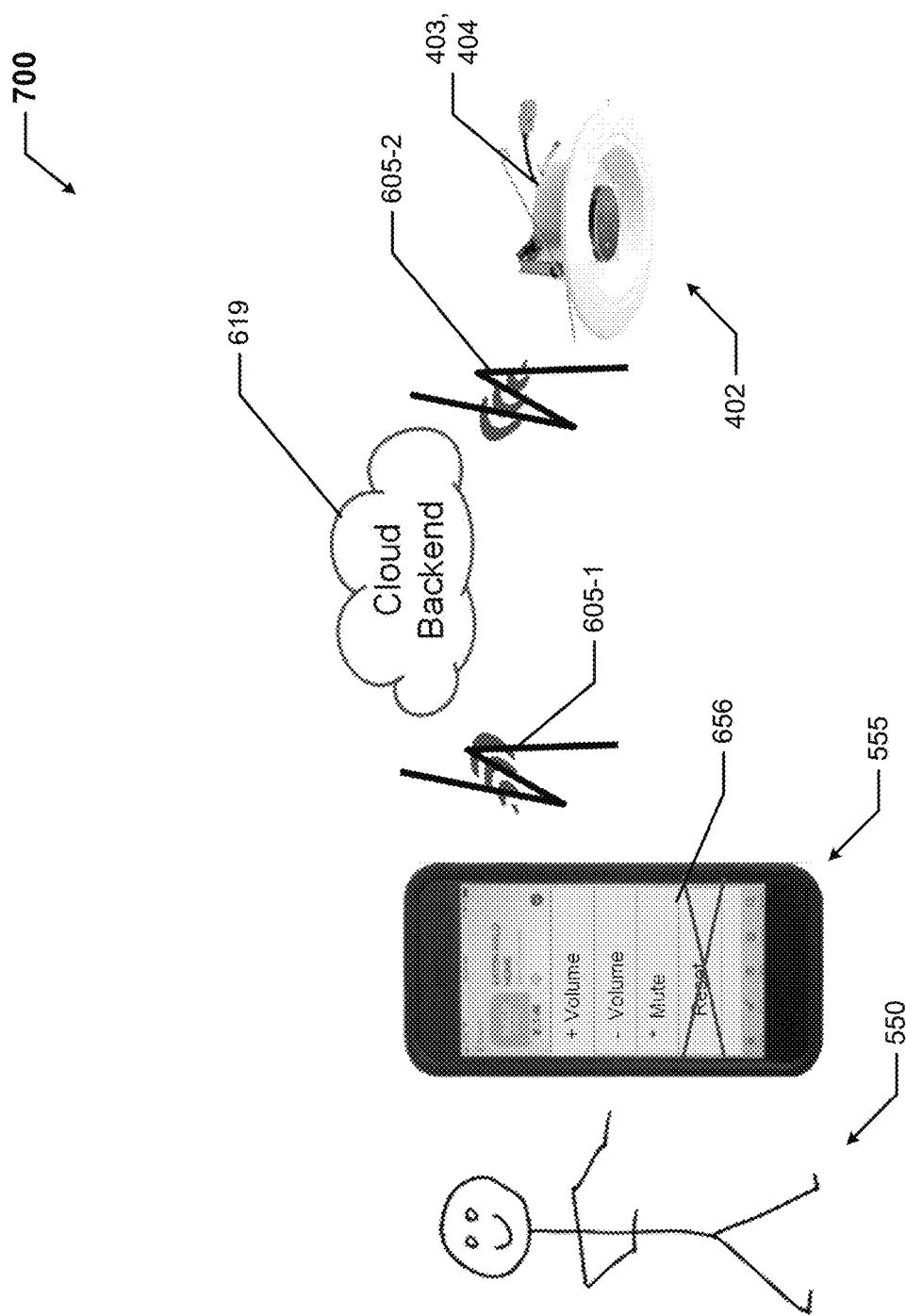

FIGS. 6 and 7 show a system 600 for remotely controlling the electrical device 402 of FIG. 4 in accordance with the current art. Referring to FIGS. 1 through 6, the system 600 of FIG. 6 has the electrical device 402 of FIG. 4 remotely located relative to the user 550 carrying the user system 555. The user system 555 in this case includes an app 656 that can remotely control some, but not all, of the functions that are also controlled using the integrated control interfaces 484. Specifically, in the current art, the app 656 on the user system 555 in this example allows the user 550 to remotely control the functions that are also controlled by integrated control interface 484-1 (mute the volume), integrated control interface 484-2 (increase the volume), and integrated control interface 484-3 (decrease the volume). However, the app 656 on the user system 555 does not allow the user 550 to remotely control integrated control interface 484-4 (reset, turn the power on and off).

The app 656 sends communication signals through a cloud backend server 619 to the access controller 404 (disposed within the housing 403 of the electrical device 402) using communication links 605. Specifically, communication link 605-1 is used to send the communication signals from the app 656 on the user system 555 to the cloud backend server 619, and communication link 605-2 is used to send the communication signals from the cloud backend server 619 to the access controller 404 of the electrical device 402. This communication network is Internet-based, which is the way that communication with a number of electrical devices, particularly voice-activated control devices, is configured.

A principal reason that the app 656 does not allow the user 550 to remotely control integrated control interface 484-4 (reset, turn the power on and off) is shown in FIG. 7. Specifically, a primary use of the reset button (integrated control interface 484-4) is to recover the electrical device 402 (or portions thereof, such as the voice-activated personal assistant 452) when the electrical device 402 is unable to connect to the Internet, and therefore is unable to communicate with the user 550 through the associated user device 555. When the integrated control interface 484-4 is physically out of reach of the user 550, and when the Internet is down, the current art does not allow for the user 550 to safely and remotely access the integrated control interface 484-4 to recover the electrical device 402 (or portions thereof).

Figure 8:
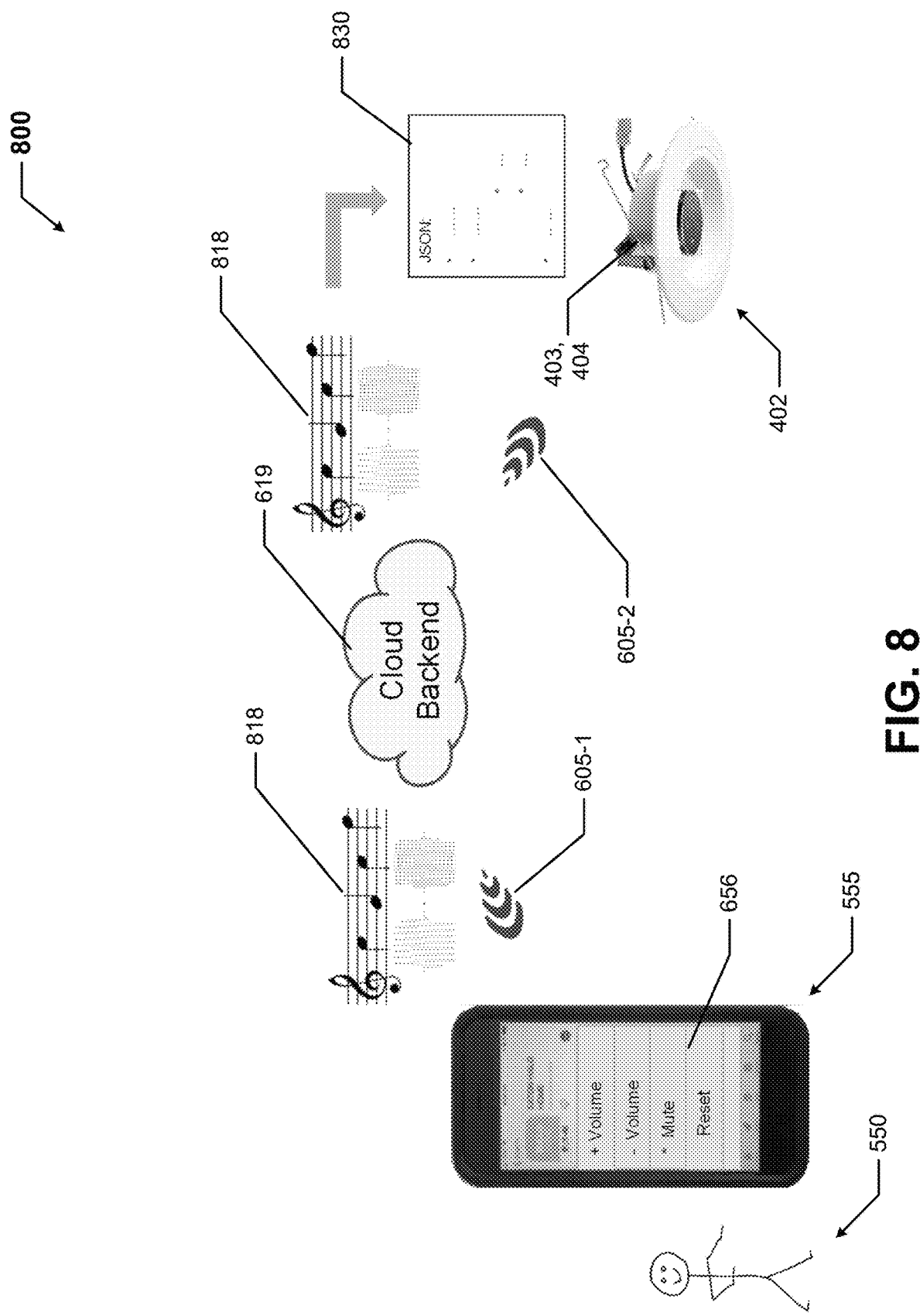
FIGS. 8 and 9 show a system for remotely controlling the electrical device of FIG. 4 in accordance with certain example embodiments.
Figure 9:
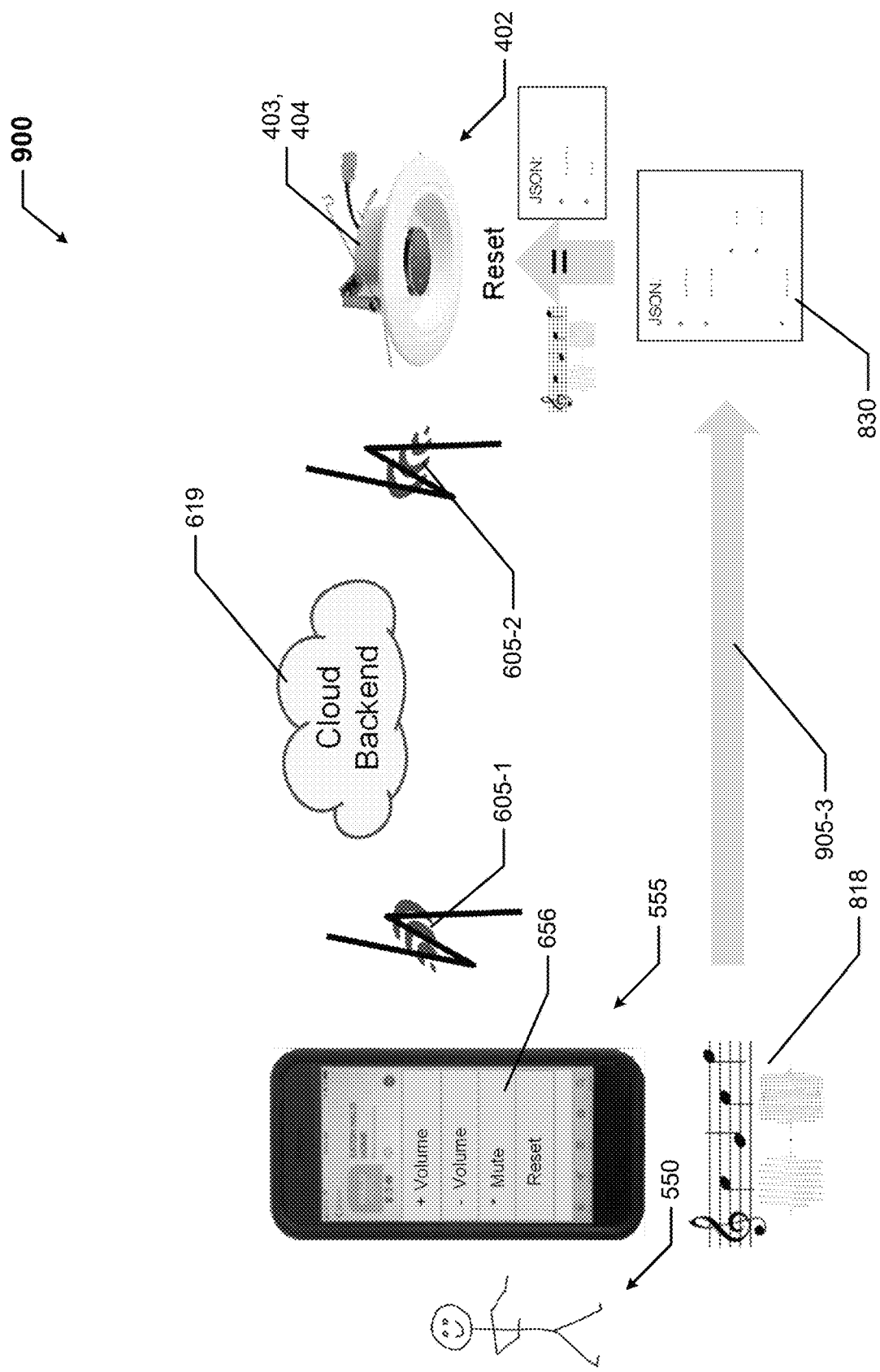

FIGS. 8 and 9 show a system for remotely controlling the electrical device of FIGS. 4 through 7 in accordance with certain example embodiments. Referring to FIGS. 1 through 9, FIG. 8 shows a system 800 at a point in time where the user 550, using the user device 555, initiates (e.g., registers, commissions) the electrical device 402. When this occurs, a unique tone sequence 818 is generated and shared between the access controller 404 (disposed within the housing 403) of the electrical device 402 and the user device 555 using communication link 605-1, communication link 605-2, and the cloud backend server 619.

This unique tone sequence 818 is a form of a communication. The unique tone sequence 818 can be generated by the access controller 404, by the user device 555, by the user 550, by a network manager (e.g., network manager 280), by another access controller of another electrical device in the system 800, or by some other component of the system 800 or another system in communication with the system 800. In any case, the unique tone sequence 818 is specific to the user 550 or user device 555 and provides the user 550 or user device 555, once received by the access controller 404, authorization to perform a specific control on the electrical device 402 or portion thereof. In this case, the unique tone sequence 818 is limited to resetting the electrical device 402 so that the electrical device 402 can be recovered when the Internet is not working. The access controller 404 can store the unique tone sequence 818 in the storage repository 830 (similar to the storage repository 230 of FIG. 2). When the unique tone sequence 818 is assigned, it is stored in the app 656 on the user device 555.

FIG. 9 shows a system 900 that is identical to the system 800 of FIG. 8, except at a later time when the Internet is down. In other words, communication link 605-1, communication link 605-2, and/or the cloud backend server 619 is out of service at the point in time captured in FIG. 9. In such a case, when the user 550 selects the "Reset" function on the app 656 loaded on the user system 555, the user system 555 emits the unique tone sequence 818 within listening range (a type of communication range, as in communication range 185 of FIG. 1) of a microphone (a type of sensor, as in sensor 475-1 of FIG. 4 and sensor 275 of FIG. 2) of the electrical device 402.

The emission or broadcast of the unique tone sequence 818 by the user system 555 can be considered using a type of communication link 905-3. Upon receiving the unique tone sequence 818, the access controller 404 recognizes the unique tone sequence 818 (using the storage repository 830), verifies that the unique tone sequence 818 is assigned to a particular user system 555, and instructs or forces the electrical device 402 to reset. This sequence shown in FIG. 9 can be performed regardless of whether the Internet is down or working properly.

Figure 10:
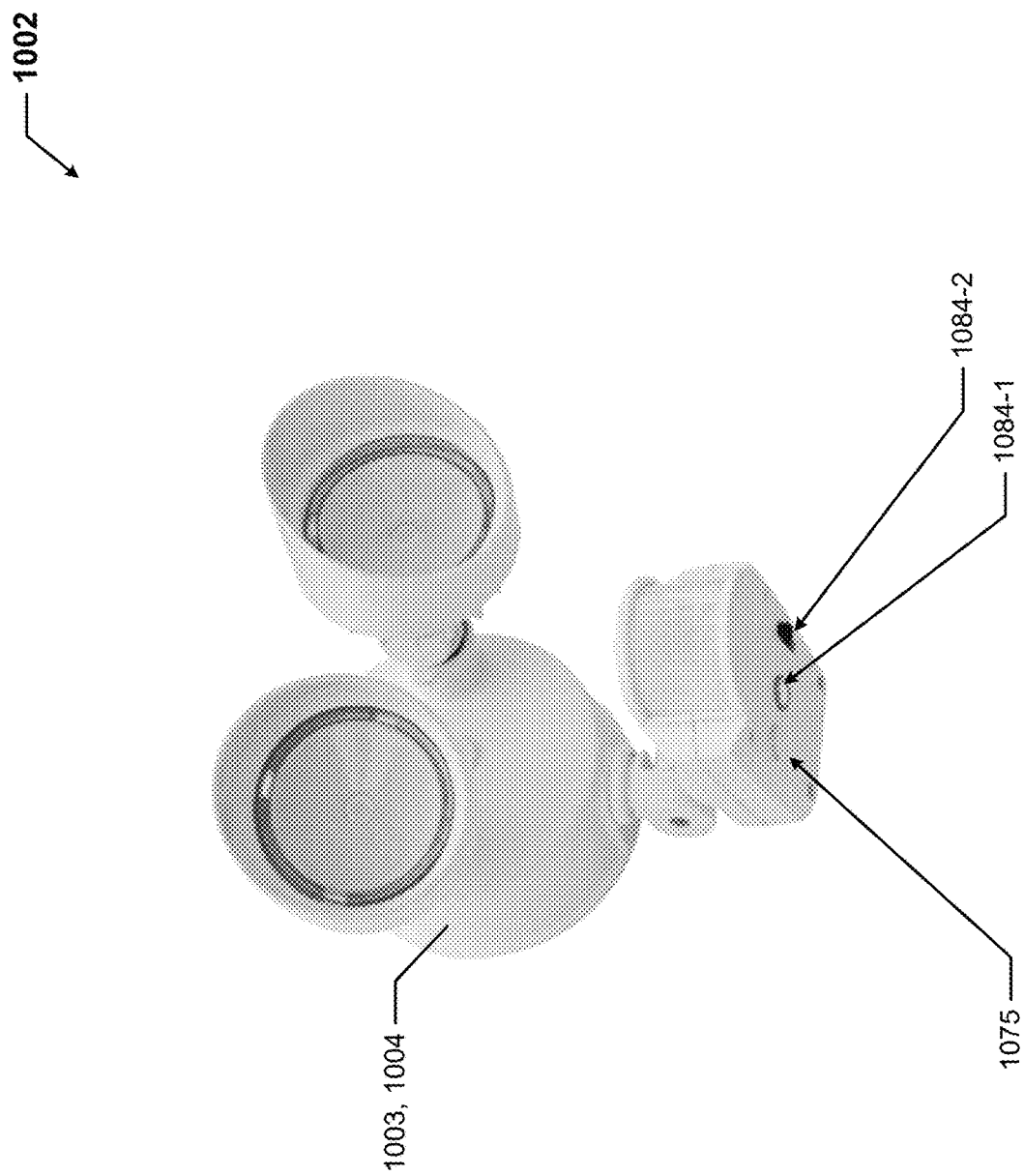
FIG. 10 shows another electrical device in accordance with certain example embodiments.

FIG. 10 shows another electrical device 1002 in accordance with certain example embodiments. The various components of the electrical device 1002 of FIG. 10 are substantially the same as the corresponding components of the electrical device 202 of FIG. 2 above. Referring to FIGS. 1 through 10, the electrical device 1002 in this case is an outdoor security flood light. The electrical device 1002 has an outer surface of a housing 1003 on which are disposed two integrated control interfaces 1084 (integrated control interface 1084-2 and integrated control interface 1084-2 and one sensor 1075. In this case, the integrated control interface 1084-1 is a button that resets the electrical device 1002. The integrated control interface 1084-2 is a switch that turns the power electrical device on and off. The sensor 1075 in this case is a camera.

The integrated control interfaces 1084 of the electrical device 1002 are out of reach to a user (e.g., user 250) because the electrical device 1002 is mounted at the top of a building 1176, and so the user is unable to physically engage the integrated control interfaces 1084 without assistance (e.g., use of a ladder). To resolve this issue, the electrical device 1002 includes an example access controller 1004 (substantially similar to access controller 204) that is disposed within the housing 1003 of the electrical device 1002. In this particular example, the access controller 1004 of the electrical device 1002 can reset the electrical device 1002 and/or turn the electrical device 1002 on and off based on a communication received from a user or user system.

Figure 11:
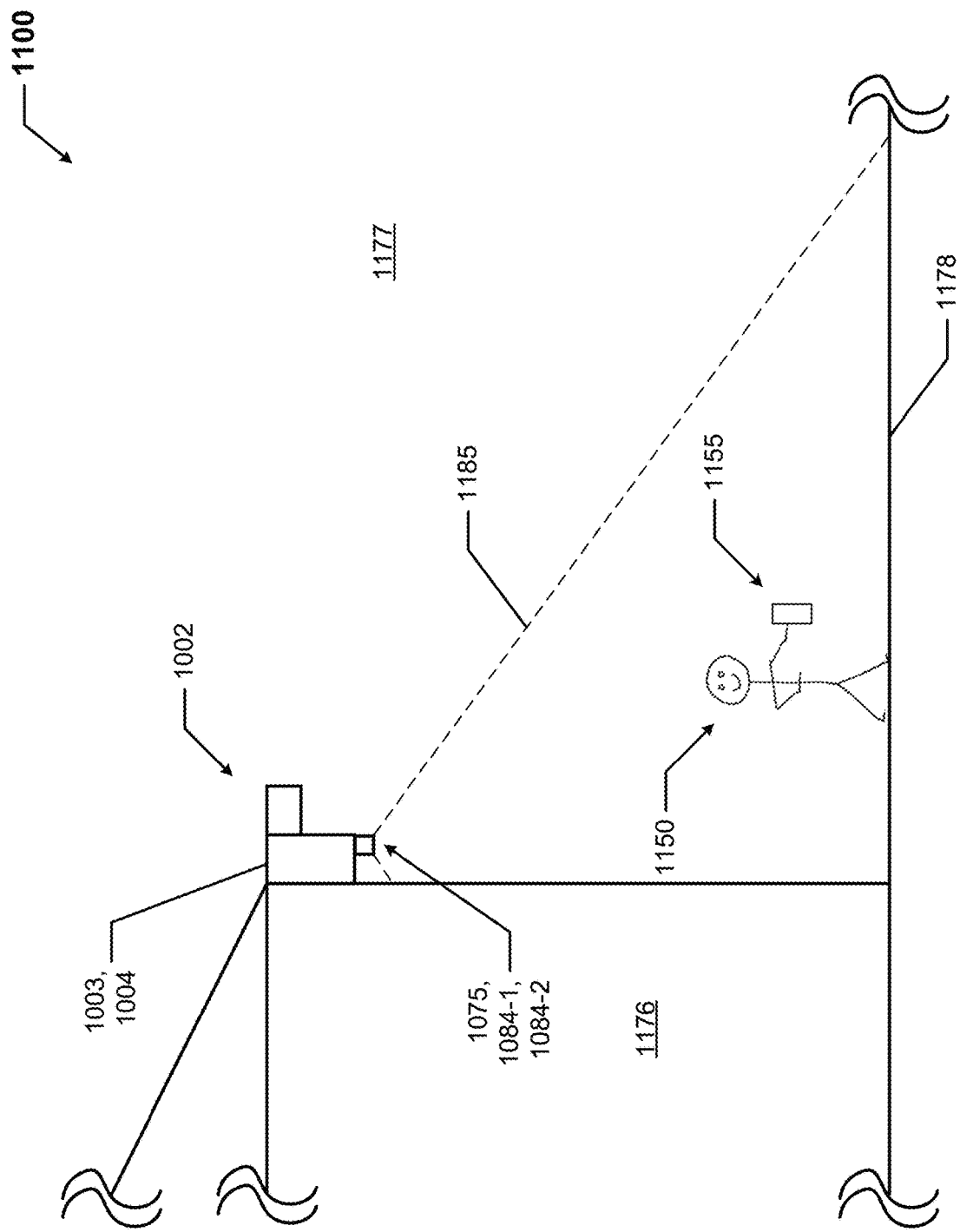
FIG. 11 shows a system for remotely controlling the electrical device of FIG. 6 in accordance with certain example embodiments.

FIG. 11 shows a system 1100 for remotely controlling the electrical device 1002 of FIG. 10 in accordance with certain example embodiments. Referring to FIGS. 1 through 11, the system 1100 of FIG. 11 has the electrical device 1002 of FIG. 10 mounted at the top of an exterior wall of a building 1176. A user 1150 is walking on the ground 1178 in a volume of space 1177 outside the building 1176, somewhat under the electrical device 1002. The user 1150 is carrying a user system 1155 (e.g., a mobile device) in his hand.

Integrated control interface 1084-1 and integrated control interface 1084-2 are visible to the user 1150, but the height of the electrical device 1002 relative to the ground 1178 is too great for the user 1150 to practically or, in some cases, safely reach the integrated control interfaces 1084 of the electrical device 1002 to have physical interaction with the integrated control interfaces 1084. Also, in this case, there is no dedicated remote control, app on the user system 1155, or other conventional methods to remotely control the functions that are controlled by the integrated control interfaces 1084.

In certain example embodiments, the example access controller 1004 of the electrical device 1002 and/or the sensor 1075 have a communication range 1185, similar to the communication range 185 discussed above with respect to FIG. 1. If the user 1150 or the user system 1155 is within the communication range 1185 and sends a communication to the access controller 1004, through the sensor 1075, the communication will be received by the access controller 1004. Consequently, the user 1150 or user system 1155 can control the electrical device 1002 through the access controller 1004 based on the communication, once the access controller 1004 has authenticated the authority of the user 1150 or user device 1155, determined the control command to implement based on the communication, and resolved any potential conflicts with other contrary commands.

Many electrical devices, such as electrical device 1002 of FIGS. 10 and 11, are connected to the Internet. In such a case, such devices often include integrated control interface 1084-1 so that the user 1150 can return the electrical device 1002 to a factory reset state (factory default settings). This is often done intentionally by a user 1002 in cases where accounts are reconfigured (e.g., new Internet provider, new wireless router), the user 1150 is moving, or in response to some other event.

Figure 12:
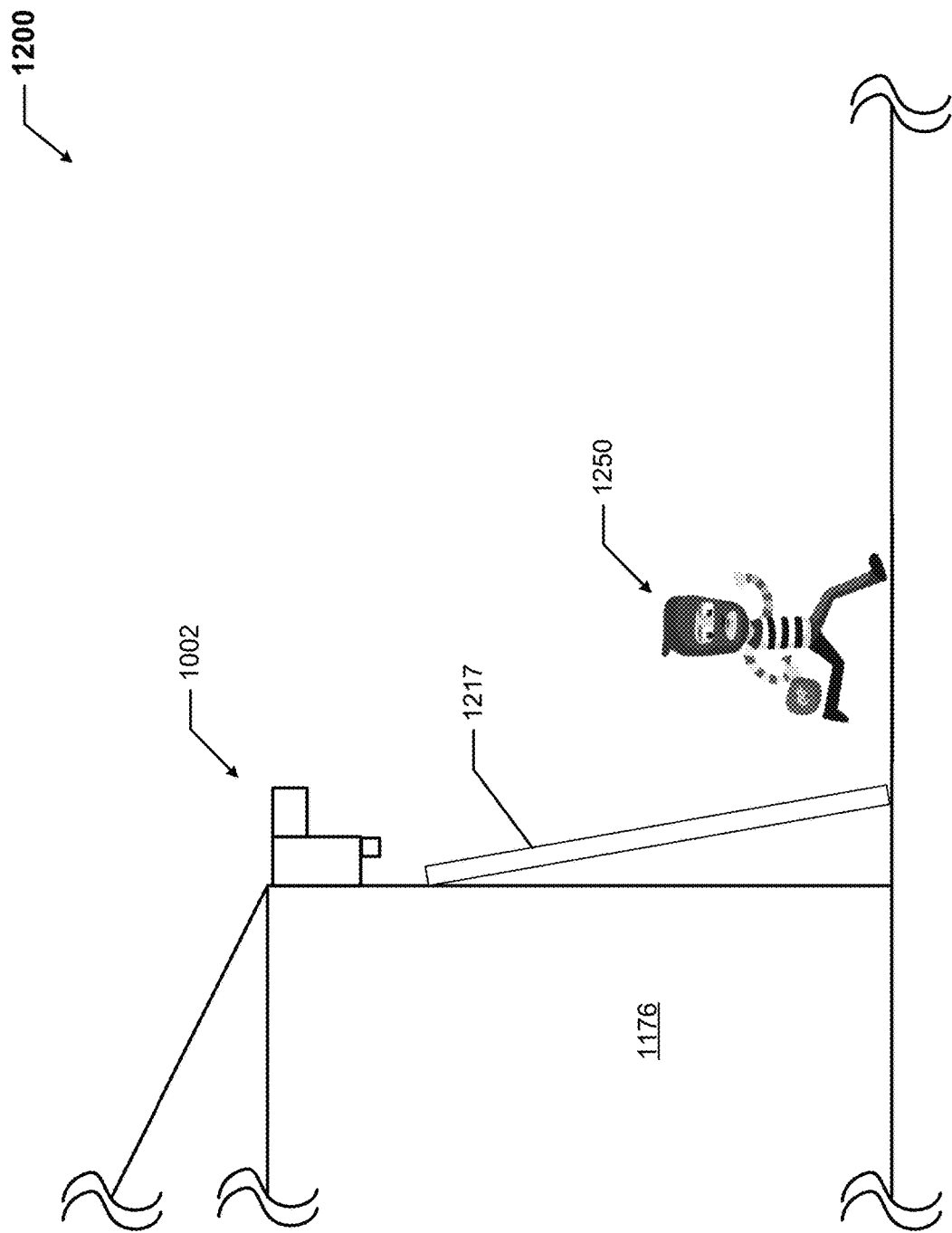
FIG. 12 shows a system for remotely controlling the electrical device of FIGS. 10 and 11 in accordance with the current art.

Using the currently existing technology, as shown in the system 1200 of FIG. 12, there is no security or validation around engaging that integrated control interface 1084-1 to reset some or all of the electrical device 1002. In other words, in the current art, anyone can be an authorized user, as long as he or she can physically engage the integrated control interface 1084-1. For example, in the case of the system 1200 of FIG. 12, which shows the current art, the user 1250 is a criminal who used a ladder 1217 to reset the electrical device 1002 by directly engaging the integrated control interface 1084-1, and then subsequently burglarized the house 1176 and escaped in the cover of darkness.

Figure 13:
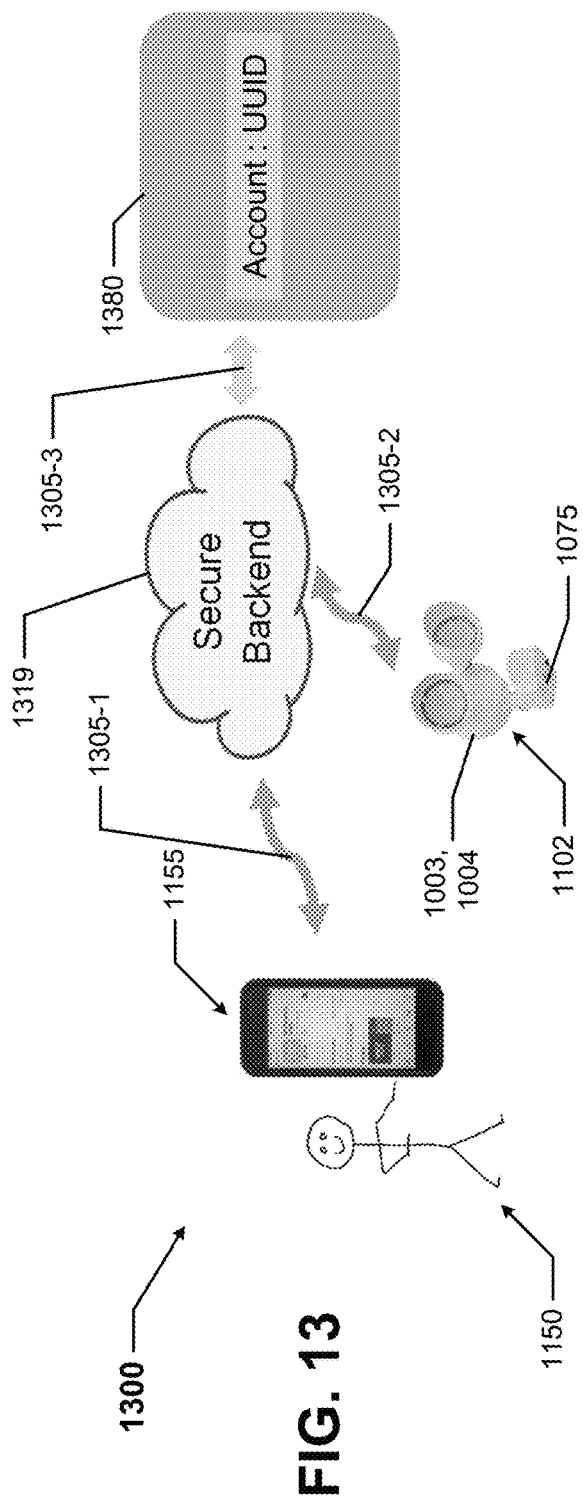
FIGS. 13 and 14 show a system for remotely controlling the electrical device of FIGS. 10 and 11 in accordance with certain example embodiments.
Figure 14:
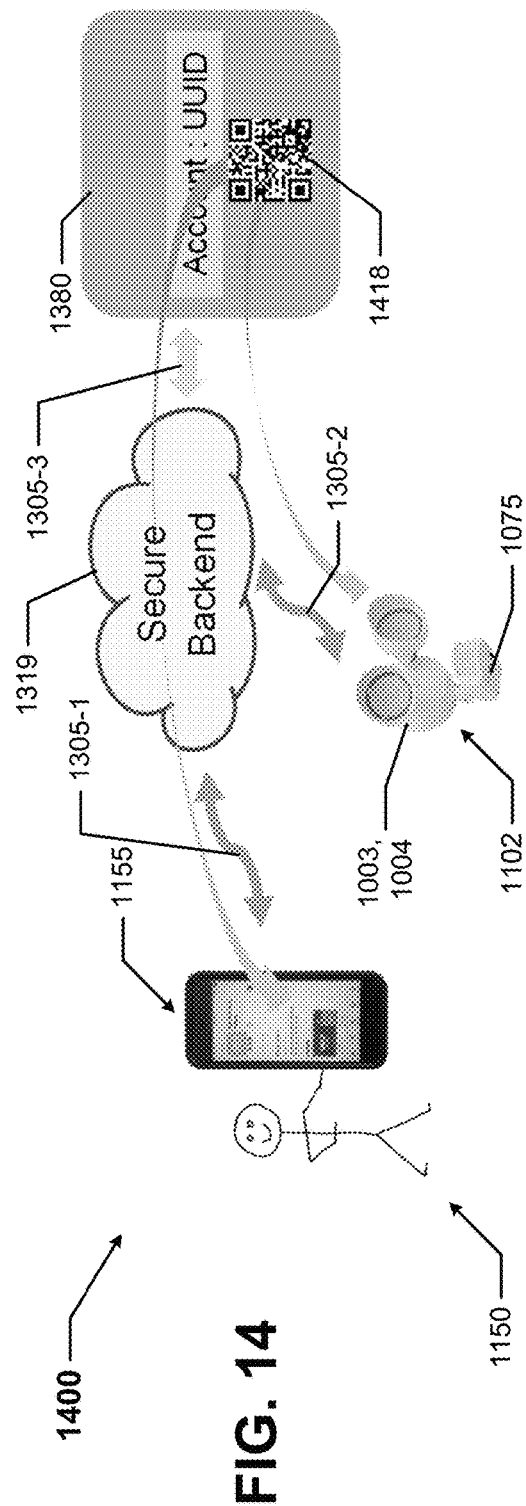

FIGS. 13 and 14 show how example embodiments can be implemented relative to the example of FIG. 11. Referring to FIGS. 1 through 14, FIG. 13 shows a system 1300 at a point in time where the user 1150, using the user device 1155, initiates (e.g., registers, commissions) the electrical device 1002. When this occurs, a unique identifier (UUID) of the electrical device 1002 is shared between the access controller 1004 (disposed within the housing 1003) of the electrical device 1002, the user device 1155, and a network manager 1380 using communication link 1305-1, communication link 1305-2, communication link 1305-3, and the cloud backend server 1319.

When the network manager 1380 receives the UUID, as shown in the system 1400 of FIG. 14, the network manager 1380 can generate a QR code 1418, which can be sent by the network manager 1380 to the user system 1155 and the access controller 1004 of the electrical device 1002 using communication link 1305-1, communication link 1305-2, communication link 1305-3, and the cloud backend server 1319. The QR code 1418 is a form of a communication. Alternatively, the QR code 1418 can be generated by the access controller 1004, by the user device 1155, by the user 1150, by another access controller of another electrical device in the system 1400, or by some other component of the system 1400 or another system in communication with the system 1400.

When the electrical device 1002 includes the sensor 1075 in the form of a camera, then when the QR code 1418 is presented within the communication range (e.g., communication range 1185 of FIG. 11) of the camera, the access controller 1004 can recognize, through the sensor 1075, the QR code 1418, verify that the QR code 1418 is assigned to a particular user 1150 or user system 1155, and perform some requested and approved control of the electrical device 1002. This sequence shown in FIG. 14 can be performed regardless of whether the Internet is down or working properly. The QR code 1418 can be presented on a display of the user system 1155, on a piece of paper held by the user 1150, or in any other suitable form. The size of the QR code 1418 can be a factor to determine the size of the communication range of the camera in this example.

Figure 15:
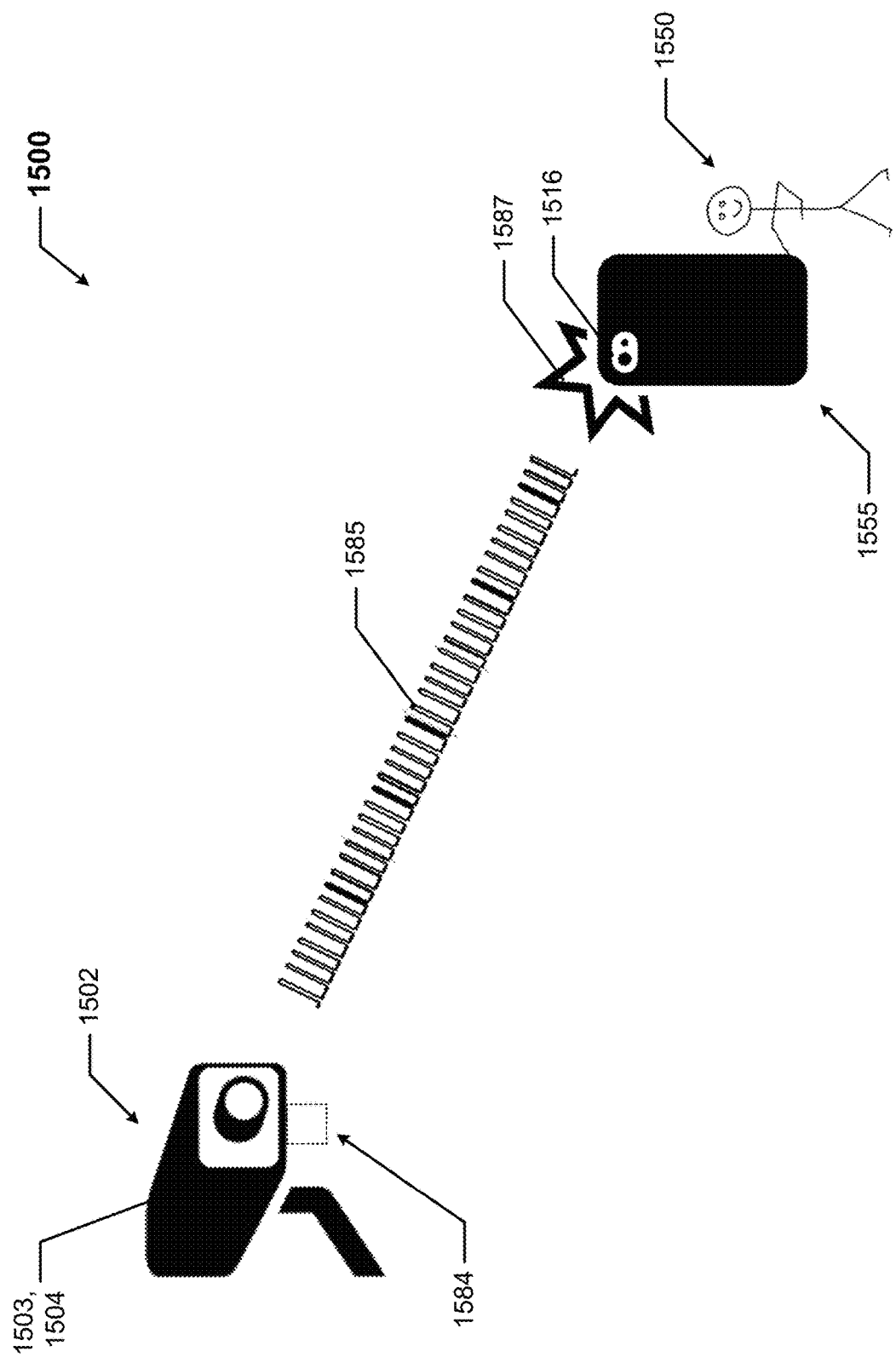
FIG. 15 shows another system for remotely controlling another electrical device in accordance with certain example embodiments.

FIG. 15 shows another system 1500 for remotely controlling another electrical device in accordance with certain example embodiments. Referring to FIGS. 1 through 15, the system 1500 of FIG. 15 includes an electrical device 1502 in the form of a security camera. The electrical device 1502 includes an example access controller 1504 disposed within a housing 1503 of the electrical device 1502. There is also an optional integrated control interface 1584 disposed on the bottom side of the housing 1503. In this case, the integrated control interface 1584 is a button that resets the electrical device 1502. The camera has a communication range 1585, part of which is shown in FIG. 15. In this case, the camera of the electrical device 1502 is both a sensor device (e.g., sensor device 275 of FIG. 2) and an electrical device component (e.g., electrical device component 242).

The system 1500 of FIG. 15 also includes a user 1550 with a user system 1555 in the form of a cell phone with a flash 1516 and an app (e.g., app 656) loaded on the cell phone. During commissioning of the electrical device 1502 (or at some other time or during some other event), the app of the user system 1555 requests the user 1550 to enter the required credentials for the electrical device 1502 to use in connecting to a secure network. The app software then uses the camera flash 1516 to generate a modulated light signal 1587 (a form of communication) that contains the credentials. The user 1550 aims the flash 1516 towards the electrical device 1502 (in this case, the camera lens), which detects the modulated light signal 1587 and sends the modulated light signal 1587 (or some form thereof) to the access controller 1504.

Once the modulated light signal 1587 (also sometimes called a modulated light beam 1587) has been successfully received by the access controller 1504, the access controller 1504 extracts the data embedded in the modulated light signal 1587, and then subsequently performs the network connection sequence and securely connects to the network (not shown in this example, but similar to the networks shown in FIGS. 8, 9, 13, and 14, for example). The electrical device 1502 (with or without the assistance of the access controller 1504) then proceeds to complete the commissioning process over the network and notifies the user 1550, through an app interface on the user system 1555, that the connection and commissioning process is complete.

In addition to or in the alternative of commissioning the electrical device 1502, example embodiments can be used for other purposes, such as remotely and securely resetting the electrical device 1502 to its factory (default) settings. For example, to initiate a factory reset command, the user 1550 selects the reset function in an app on the user system 1555, and the software uses the camera flash 1516 to generate a modulated light signal 1587, while the user system 1555 is in the communication range 1585 of the sensor (camera in this case) of the electrical device 1502, that contains the reset command and authentication data to ensure that the reset command is valid. Once the data contained within the modulated light beam 1587 has been successfully received and processed by the access controller 1504, the access controller 1504 performs a factory reset procedure, wiping all preexisting data and credential files, and returning the electrical device 1502 to the factory default settings.

As shown by these examples above, in some cases, example embodiments can be used for one or more other purposes aside from, or in addition to, controlling one or more electrical device components of an electrical device. For instance, example embodiments can be used to commission one or more electrical devices for a new system or a modified system. In other words, example embodiments can be used for one or more of a number of different purposes with respect to one or more electrical devices in a system.

Example embodiments can control access for electrical systems. Specifically, example embodiments can be used to receive one or more communications from a user, determine the contents (identification of the user, instructions to control an electrical device) of the communications, evaluate the credentials of the user to determine the level of authority of the user, and control the electrical device based on the instructions in the communication. Example embodiments can determine whether the authorization of a user is full or partial. Example embodiments can also resolve conflicts (e.g., through a hierarchy) involving opposing control by multiple users of the same electrical devices. Example embodiments can save on maintenance and energy costs while also improving safety and reliability.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light fixture comprising:
   a local controller;
   at least one sensor that measures at least one parameter, wherein the at least one sensor is unable to detect radio frequency signals, and wherein the at least one sensor is configured to receive a communication transmitted using the at least one parameter at a point in time;
   an integrated control interface disposed on a housing of the light fixture and coupled to the local controller, wherein the integrated control interface allows for manual resetting of the local controller; and
   an access controller communicably coupled to the local controller and the at least one sensor, wherein the access controller comprises a communication module that is unable to communicate using the radio frequency signals at the point in time, wherein the access controller is configured to:
   receive the communication from the at least one sensor, wherein the communication comprises credentials and instructions to control the local controller;
   confirm the credentials against data stored in a storage repository of the access controller, wherein the credentials indicate an authority to reset the local controller; and
   reset, based on confirming the credentials, the local controller according to the instructions.

2. The light fixture of claim 1, wherein the credentials limit an amount of resetting the local controller by the access controller compared to manually engaging the integrated control interface.

3. The light fixture of claim 1, wherein the at least one sensor comprises a camera, and wherein the communication is transmitted as facial expression made by a user to the camera.

4. The light fixture of claim 1, wherein the at least one sensor comprises a camera, and wherein the communication is transmitted as a series of gestures made by a user to the camera.

5. The light fixture of claim 1, wherein the at least one sensor comprises a camera, and wherein the communication comprises a QR code generated by a user system of a user and presented on a display to the camera.

6. The light fixture of claim 1, wherein at least one sensor comprises a microphone that receives and processes a sound parameter, and wherein the communication is transmitted as a series of sounds emitted by a user.

7. The light fixture of claim 1, wherein the communication module of the access controller is able to communicate using the radio frequency signals prior to the point in time.

8. The light fixture of claim 7, wherein the communication module receives the credentials in a prior communication transmitted using the radio frequency signals prior to the point in time.

9. The light fixture of claim 1, wherein the local controller controls a light source for providing general illumination.

10. The light fixture of claim 1, wherein the local controller controls a voice-activated device integrated with the light fixture.

11. The light fixture of claim 1, wherein the communication is transmitted as a modulated light.

12. The light fixture of claim 1, wherein the access controller is further configured to:
disable the integrated control interface upon resetting the local controller based on the instructions.

13. A system comprising:
a user that transmits a communication without using radio frequency signals; and
an electrical device comprising:
a device controller;
at least one sensor that measures at least one parameter within a communication range, wherein the at least one sensor receives the communication transmitted using the at least one parameter at a point in time; and
an integrated control interface disposed on a housing of the electrical device and coupled to the at least one device controller, wherein the integrated control interface allows for manual resetting of the at least one device controller; and
an access controller communicably coupled to the device controller and the at least one sensor, wherein the access controller comprises a communication module that is unable to communicate using radio frequency signals at the point in time, wherein the access controller:
receives, from the at least one sensor, the communication, wherein the communication comprises credentials of the user and instructions to reset the device controller;
confirms the credentials against data stored in a storage repository of the access controller, wherein the credentials indicate an authority to reset the device controller; and
resets, based on confirming the credentials, the device controller based on the instructions.

14. The system of claim 13, wherein the integrated control interface of the electrical device is inaccessible to the user without assistance.

15. The system of claim 13, wherein the communication is sent by a user system of the user, wherein the user system comprises a light source that generates a modulated light signal, wherein the communication is incorporated into the modulated light signal.

16. The system of claim 15, wherein the light source comprises a flash of a camera.

17. The system of claim 13, wherein resetting the device controller based on the instructions performs a subset of resetting functions relative to resetting the device controller using the integrated control interface.

18. The system of claim 13, further comprising:
a network manager communicably coupled to the access controller, wherein the network manager manages the authority of the user to reset the device controller.

19. The system of claim 13, wherein the communication module of the access controller is able to communicate using radio frequency signals at a later time that is subsequent to the point in time when the device controller is reset.

20. The system of claim 13, wherein the communication is established during commissioning of the electrical device.

* * * * *